United States Patent
Miyazaki et al.

(10) Patent No.: US 12,517,079 B2
(45) Date of Patent: Jan. 6, 2026

(54) MEASUREMENT DEVICE AND MEASUREMENT METHOD

(71) Applicants: FUJIDENOLO CO., LTD., Komaki (JP); THE NATIONAL RESEARCH AND DEVELOPMENT AGENCY, JAPAN FISHERIES RESEARCH AND EDUCATION AGENCY, Yokohama (JP); School Judicial Person IKUTOKUGAKUEN, Atsugi (JP)

(72) Inventors: Hideki Miyazaki, Komaki (JP); Tetsuya Kuwabara, Komaki (JP); Yuko Murata, Yokohama (JP); Akira Yamamura, Atsugi (JP)

(73) Assignees: FUJIDENOLO CO., LTD., Komaki (JP); THE NATIONAL RESEARCH AND DEVELOPMENT AGENCY, JAPAN FISHERIES RESEARCH AND EDUCATION AGENCY, Yokohama (JP); School Judicial Person IKUTOKUGAKUEN, Atsugi (JP)

( * ) Notice: Subject to any disclaimer, the term of this patent is extended or adjusted under 35 U.S.C. 154(b) by 425 days.

(21) Appl. No.: 18/061,798

(22) Filed: Dec. 5, 2022

(65) Prior Publication Data
US 2023/0098751 A1 Mar. 30, 2023

Related U.S. Application Data

(63) Continuation of application No. PCT/JP2020/047591, filed on Dec. 21, 2020.

(51) Int. Cl.
*G01N 27/327* (2006.01)
*G01N 27/416* (2006.01)

(52) U.S. Cl.
CPC ....... *G01N 27/327* (2013.01); *G01N 27/4166* (2013.01)

(58) Field of Classification Search
None
See application file for complete search history.

(56) References Cited

U.S. PATENT DOCUMENTS 5,746,898 A 5/1998 Preidel
2005/0258034 A1 11/2005 Iketaki
(Continued)

FOREIGN PATENT DOCUMENTS

CN 1486423 A 3/2004
CN 101918822 A 12/2010
(Continued)

OTHER PUBLICATIONS

Isao Karube et al, Monoamine oxidase electrode in freshness testing of meat, Enzyme Microb. Technol., 1980, vol. 2, April, p. 117-120.
(Continued)

*Primary Examiner* — J. Christopher Ball
(74) *Attorney, Agent, or Firm* — Muncy, Geissler, Olds & Lowe, P.C.

(57) ABSTRACT

A measurement device measures changes over time of a concentration of a measurement substance that occurs due to a reaction occurring as a result of a solution containing the analyte being dripped onto an electrode, by measuring an electric current that occurs due to electrolysis of the measurement substance. The measurement device applies a first voltage over a first application time period. The measurement device measures a first electric current flowing due to an application of the first voltage. The measurement device applies a second voltage over a second application time period. The measurement device a second electric current flowing due to an application of the second voltage. The
(Continued)

measurement device uses the first electric current to normalize the second electric current and measures a concentration of the measurement substance that has changed based on the reaction or a concentration of the analyte that has changed based on the reaction.

3 Claims, 45 Drawing Sheets

(56) References Cited

U.S. PATENT DOCUMENTS

| | | |
|---|---|---|
| 2008/0179197 A1 | 7/2008 | Wu |
| 2009/0177406 A1 | 7/2009 | Wu |
| 2010/0270178 A1 | 10/2010 | Guo et al. |
| 2010/0327886 A1 | 12/2010 | Nakamura |
| 2013/0228472 A1 | 9/2013 | Wu |
| 2013/0277234 A1 | 10/2013 | Burke et al. |
| 2014/0151246 A1 | 6/2014 | Wu |
| 2014/0246336 A1 | 9/2014 | Ooe |
| 2015/0316501 A1 | 11/2015 | Wu |
| 2017/0045469 A1 | 2/2017 | Kaneda et al. |
| 2018/0059048 A1 | 3/2018 | Wu |
| 2019/0277828 A1 | 9/2019 | Hiramoto et al. |
| 2020/0271619 A1 | 8/2020 | Wu |

FOREIGN PATENT DOCUMENTS

| | | |
|---|---|---|
| CN | 103946701 A | 7/2014 |
| EP | 3438661 A1 | 2/2019 |
| EP | 3553511 A1 | 10/2019 |
| JP | H04233446 A | 8/1992 |
| JP | 2009510434 A | 3/2009 |
| JP | 2010121948 A | 6/2010 |
| JP | 2012008151 A | 1/2012 |
| JP | 2017037067 A | 2/2017 |
| JP | 2018173415 A | 11/2018 |
| WO | 2011/151953 A1 | 12/2011 |
| WO | 2018105454 A1 | 6/2018 |

OTHER PUBLICATIONS

International Search Report of the corresponding International Application No. PCT/JP2020/047591 mailed Feb. 9, 2021 and English translation thereof.
Extended EP Search Report for the corresponding EP App 20966771.6 mailed Aug. 13, 2024.
Carralero V et al: "Pulsed Amperometric Detection of Histamine at Glassy Carbon Electrodes Modified with Gold Nanoparticles" Electroanalysis 2005, 17 No. 4.
CN Office Action for the corresponding CN App 202080101768.1 mailed Aug. 19, 2024 and English translation thereof.
Ricarda Torre et al. "Diamine oxidase-modified screen-printed electrode for the redox-mediated determination of histamine", Journal of Analytical Science and Technology (2020) 11:5.

FIG. 40

| TIME | AFTER 3 MINUTES | AFTER 4 MINUTES | AFTER 5 MINUTES | AFTER 6 MINUTES | AFTER 7 MINUTES | AFTER 8 MINUTES | AFTER 9 MINUTES | AFTER 10 MINUTES | ∞ |
|---|---|---|---|---|---|---|---|---|---|
| HISTAMINE CONCENTRATION [/ppm] | −0.45% | −0.45% | −0.46% | −0.47% | −0.47% | −0.47% | −0.47% | −0.47% | −0.46% |
| $R^2$ | 0.950 | 0.952 | 0.957 | 0.956 | 0.954 | 0.953 | 0.951 | 0.950 | 0.949 |

MEASUREMENT DEVICE AND MEASUREMENT METHOD

REFERENCE TO RELATED APPLICATIONS

This application is a Continuation application of International Application No. PCT/JP2020/047591, filed Dec. 21, 2020. This disclosure of the foregoing application is hereby incorporated by reference in its entirety.

BACKGROUND ART

A device is known that measures a concentration of a substance for analysis, by measuring an electric current that is flowing on the basis of an oxidation-reduction reaction of the substance for analysis. Also, a sensor system provided with a measurement device and a sensor strip is known. The sensor strip is provided with a working electrode and a counter electrode. A sample including glucose and the like, as the substance for analysis, is introduced to the sensor strip. The measurement device applies a pulse voltage, at least twice, to the working electrode and the counter electrode of the sensor strip to which the sample has been introduced. The measurement device acquires a contour plot showing a relationship between a voltage value of the pulse voltage and an electric current value that flows when the pulse voltage is applied. On the basis of a relationship between the acquired contour plot and a contour plot that is measured in advance for each of concentrations of the substance for analysis (hereinafter referred to as a reference plot), the measurement device determines the concentration of the substance for analysis in the sample.

Further, methods for measuring the concentration of a target substance using an electrochemical reaction include linear sweep voltammetry and cyclic voltammetry techniques. These are techniques in which a voltage is applied that changes at a fixed voltage rising/lowering rate, and the concentration is estimated on the basis of the electric current corresponding to that voltage. In addition, when a flow injection method is adopted, that is, a measurement method in which a detection fluid is caused to flow on an electrode at a fixed rate, and the detection fluid is constantly reformed, it is possible to estimate the concentration with a high degree of accuracy. On the other hand, when a batch method that is the target of the present disclosure is employed, that is, a method in which detection fluid droplets are dripped onto an electrode and measurement is performed in an electrochemical manner in that state, it is difficult to measure the concentration with a high degree of accuracy, because a concentration distribution inside the droplet that results from a loss of the substance due to electrolysis, an amount of substance transfer due to diffusion related to the concentration distribution, and the like, have a complex impact on a measured electric current value.

Furthermore, in a system resulting from reactions relating to a plurality of substances in the above-described droplet, substance movement due to diffusion of the plurality of substances, reacting amounts, and the like change in a non-uniform manner, and cause complex concentration distributions in the droplet. As a result, these further impact on the measured electric current, and cause quantitative concentration measurement using the batch method to be difficult.

DESCRIPTION

The contour plot and the reference plot change when parameters (activity of the substance for analysis, or a diffusion coefficient, for example) differ at a time of the respective measurements. Thus, it is possible that the accuracy of the concentration of the substance for analysis determined on the basis of the relationship between the contour plot and the reference plot may deteriorate due to variations in the parameters.

An object of the present disclosure is to provide a measurement device and a measurement method capable of quantifying a substance for analysis with a higher degree of accuracy, using a batch method, namely, an easy operation of simply dripping droplets onto an electrode.

Various embodiment herein provide a measurement device that measures changes over time of a concentration of a measurement substance that occurs due to a reaction occurring in an analyte as a result of a solution containing the analyte being dripped onto an electrode, by measuring an electric current that occurs due to electrolysis of the measurement substance. The measurement device includes first application means, first measurement means, acquisition means, second application means, second measurement means, and measuring means. The first application means applies, to the electrode, a first voltage over a first application time period, after elapse of a first elapsed time period subsequent to the solution being dripped onto the electrode. The first elapsed time period has a range with which progress of the reaction due to passing of time does not impact measurement accuracy. The first voltage has a range with which a loss amount or an increase amount of the measurement substance due to electrolysis does not impact the measurement accuracy. The first application time period has a range that does not impact the measurement accuracy. The first measurement means measures a first electric current flowing due to the application of the first voltage by the first application means. The acquisition means acquires, as a second elapsed time period, a recovery time period required for a concentration change of the measurement substance in the vicinity of the electrode resulting from the application of the first voltage to recover, due to diffusion of the measurement substance, to an extent not impacting on the measurement accuracy. The second application means applies, to the electrode, at least one time, a second voltage over a second application time period, after elapse of the second elapsed time period acquired by the acquisition means subsequent to the first voltage being applied by the first application means. The second voltage has a range with which a loss amount or an increase amount of the measurement substance due to electrolysis does not impact the measurement accuracy. The second application time period has a range that does not impact the measurement accuracy. The second measurement means measures a second electric current flowing due to the application of the second voltage by the second application means, each time the second voltage is applied the at least one time. The measuring means uses the first electric current measured by the first measurement means to normalize the second electric current measured by the second measurement means, and measures a concentration of the measurement substance that has changed based on the reaction or a concentration of the analyte that has changed based on the reaction.

The measurement device measures the concentration of the measurement substance or of the analyte, on the basis of the first electric current resulting from the application of the voltage for a first time, and the second electric current resulting from the application of the voltage from a second time onward. In this way, the measurement device can reduce the possibility of a deterioration in measurement accuracy due to fluctuations in parameters at the time of measurement. Thus, the measurement device can measure the concentration of the measurement substance or of the analyte with a high degree of accuracy.

Various embodiment also provide a measurement method that measures changes over time of a concentration of a measurement substance that occurs due to a reaction occurring in an analyte as a result of a solution containing the analyte being dripped onto an electrode, by measuring an electric current that occurs due to electrolysis of the measurement substance. The measurement method includes a first application process, a first measurement process, an acquisition process, a second application process, a second measurement process, and a measuring process. The first application process applies, to the electrode, a first voltage over a first application time period, after elapse of a first elapsed time period subsequent to the solution being dripped onto the electrode. The first elapsed time period has a range with which progress of the reaction due to passing of time does not impact measurement accuracy. The first voltage has a range with which a loss amount or an increase amount of the measurement substance due to electrolysis does not impact the measurement accuracy. The first application time period has a range that does not impact the measurement accuracy. The first measurement process measures a first electric current flowing due to the application of the first voltage by the first application process. The acquisition process acquires, as a second elapsed time period, a recovery time period required for a concentration change of the measurement substance in the vicinity of the electrode resulting from the application of the first voltage to recover, due to diffusion of the measurement substance, to an extent not impacting on the measurement accuracy. The second application process applies, to the electrode, at least one time, a second voltage over a second application time period, after elapse of the second elapsed time period acquired by the acquisition process subsequent to the first voltage being applied by the first application process. The second voltage has a range with which a loss amount or an increase amount of the measurement substance due to electrolysis does not impact the measurement accuracy. The second application time period has a range that does not impact the measurement accuracy. The second measurement process measures a second electric current flowing due to the application of the second voltage by the second application process, each time the second voltage is applied the at least one time. The measuring process uses the first electric current measured by the first measurement process to normalize the second electric current measured by the second measurement process, and measures a concentration of the measurement substance that has changed based on the reaction or a concentration of the analyte that has changed based on the reaction. According to the second aspect, the same effects as those of the first aspect can be achieved.

FIG. 40 is a table showing relationships between the elapsed time period after the application of the first voltage V(1), a histamine sensitivity, and a coefficient of determination $R^2$.

Embodiments embodying the present disclosure will be described in order with reference to the drawings. The referenced drawings are used to illustrate technological features that can be adopted by the present disclosure, and configurations and the like of devices described herein are not intended to limit the present disclosure, and are simply explanatory examples.

Decomposition Reaction of Histamine Using Enzyme

Figure 1:
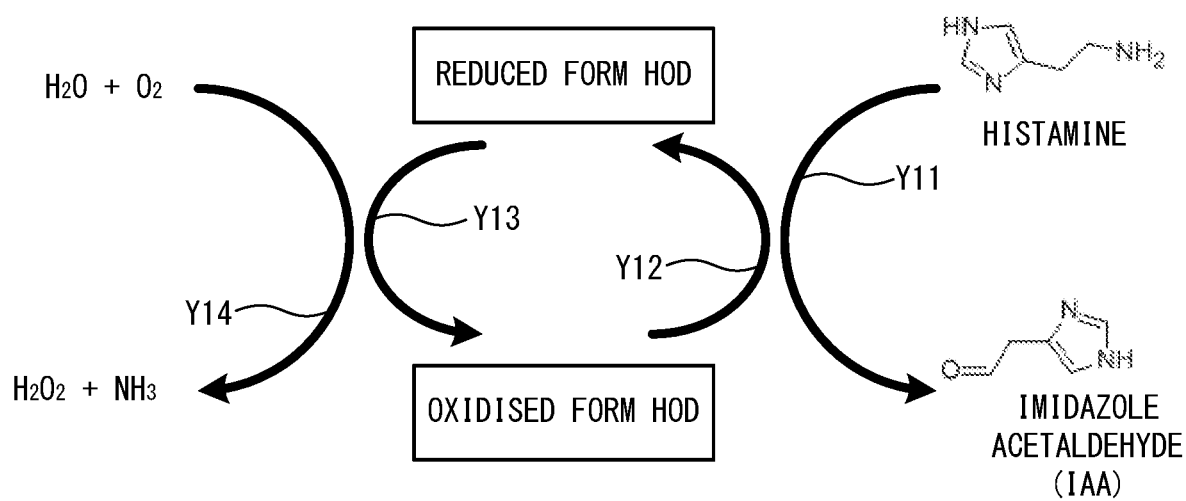
FIG. 1 is a diagram showing an enzyme reaction.

Histamine oxidase was used that was refined by causing histamine oxidase derived from *Arthrobacter crystallopoietes* KAIT-B-007 to be expressed in genetically modified *Escherichia coli*. As shown in FIG. 1, histamine is subject to oxidation and deamination and thus decomposed, by reacting with the histamine oxidase (HOD) used as an enzyme. By this reaction, imidazole acetaldehyde is generated from the histamine (an arrow Y11), and HOD transitions from an oxidized form to a reduced form as a result of a reduction reaction (an arrow Y12). Further, oxygen is decomposed by an oxidation reaction of the reduced form HOD (an arrow Y13), and hydrogen peroxide is generated from the decomposed oxygen and water (an arrow Y14). In other words, in accordance with a decomposition reaction of one molecule of histamine using HOD, one molecule of each of histamine and oxygen are lost, and one molecule of each of imidazole acetaldehyde and hydrogen peroxide are generated.

Overview and Electrical Configuration of Measurement Device 3

Figure 2:
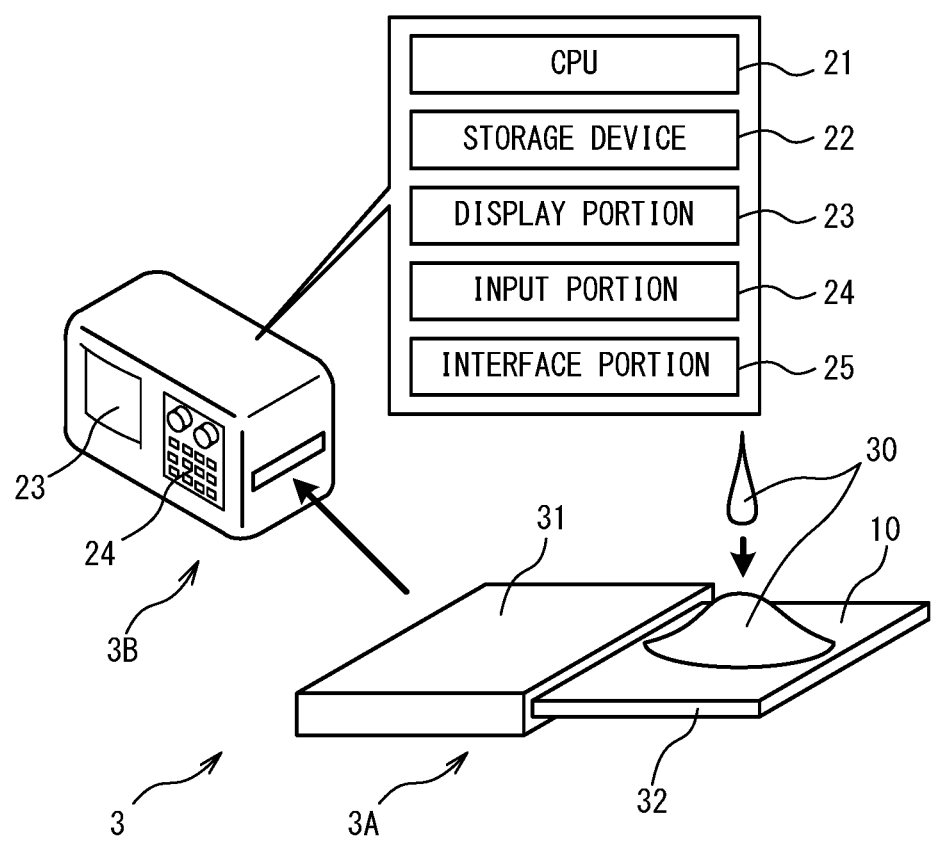
FIG. 2 is a schematic diagram showing a measurement device, and a block diagram showing an electrical configuration thereof.

As shown in FIG. 2, a measurement device 3 is a device that utilizes a reaction in which histamine is decomposed using HOD, and measures the concentration of the histamine using an electrochemical technique. The measurement device 3 is provided with a sensor chip 3A and a main body 3B. The sensor chip 3A includes a measurement portion 31 and an electrode 32. As a result of a solution, in which histamine oxidase is mixed with glutaraldehyde as a cross-linking agent, being applied to the surface of the electrode 32 and being dried, a membrane of HOD that is the enzyme (hereinafter referred to as an "enzyme membrane 10") is formed. As a solution containing histamine, a solution obtained by dissolving a sample obtained from the flesh of fish or the like in a solvent (hereinafter referred to as a "containing solution 30") is dripped onto the enzyme membrane 10. The measurement portion 31 can measure an electric current value of an electric current flowing when a voltage is applied to the electrode 32. The measured electric current value is output to the main body 3B. The main body 3B measures the concentration of the histamine contained in a sample in the containing solution 30, on the basis of the electric current value output from the sensor chip 3A.

The main body 3B is provided with a CPU 21, a storage device 22, a display portion 23, an input portion 24, and an interface portion 25. The CPU 21 performs overall control of the measurement device 3. The storage device 22 stores programs executed by the CPU 21, various parameters, various tables, and measurement results. The display portion 23 displays the measured histamine concentration. The input portion 24 receives an input operation on the main body 3B. The interface portion 25 performs communication with the sensor chip 3A.

Figure 3:
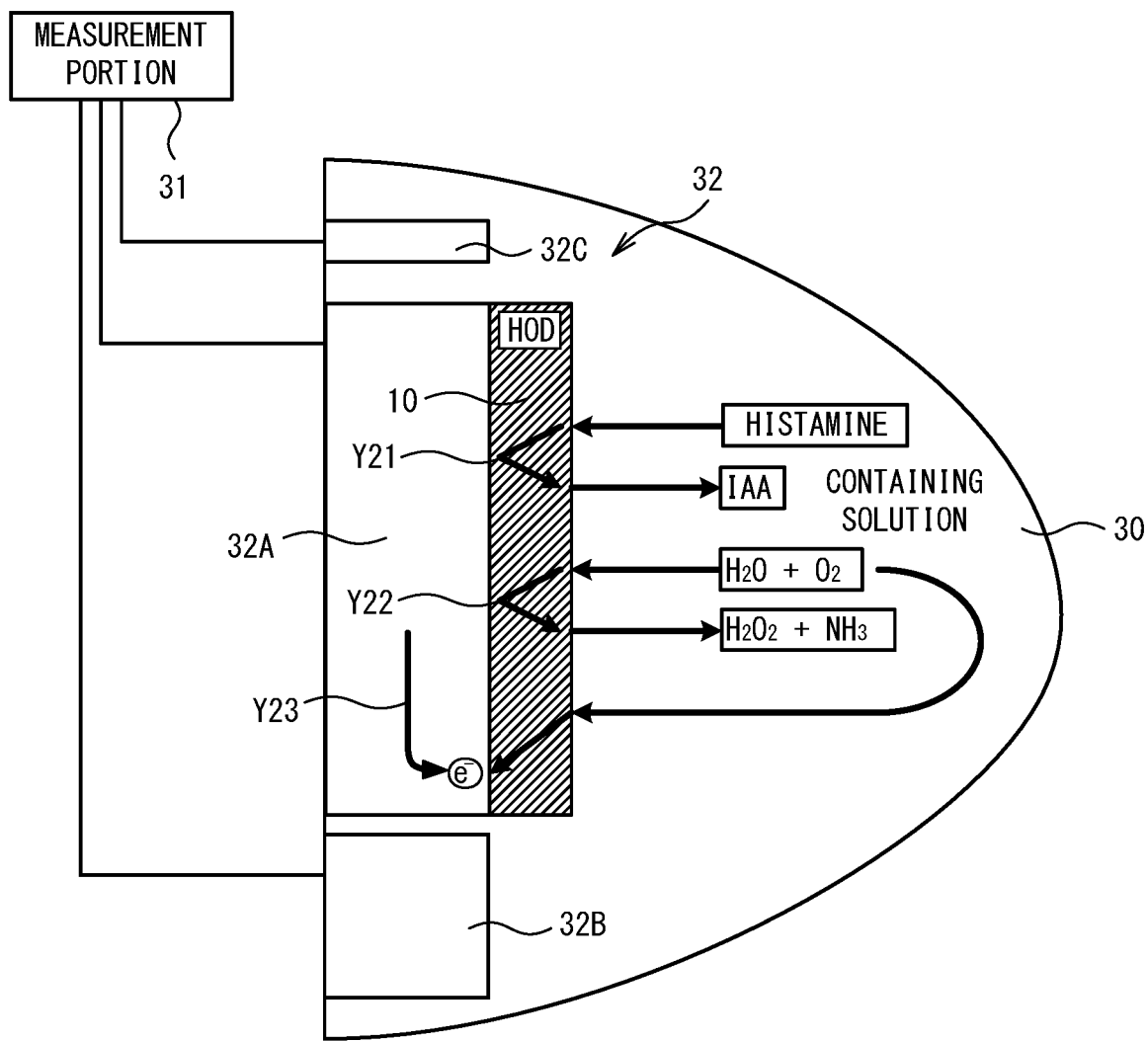
FIG. 3 is an expanded view of an electrode.

As shown in FIG. 3, the electrode 32 of the sensor chip 3A includes electrodes 32B and 32C in addition to an electrode 32A that includes the surface on which the enzyme membrane 10 is formed by the enzyme. The electrode 32A is a working electrode, the electrode 32B is a counter electrode, and the electrode 32C is a reference electrode. When the containing solution 30 is dripped onto the enzyme membrane 10, the histamine contained in the containing solution 30 is decomposed as a result of reaction with the HOD of the enzyme membrane 10, and imidazole acetaldehyde (IAA) is generated (an arrow Y21). Further, in the course of the histamine being decomposed by the HOD, oxygen in the containing solution 30 is consumed by an oxidation reaction, and hydrogen peroxide is generated (an arrow Y22).

The CPU 21 (refer to FIG. 2) of the main body 3B outputs, to the measurement portion 31 (refer to FIG. 2) of the sensor chip 3A, a signal specifying the voltage to be applied to the electrode 32. As shown in FIG. 3, in accordance with the signal, the measurement portion 31 applies the specified voltage to the electrode 32A, using the electrodes 32B and 32C as a reference. At this time, the oxygen remaining in the containing solution 30 permeates the enzyme membrane 10 of the electrode 32A and reaches the electrode 32. The oxygen combines with the electrons supplied from the electrode 32A, and breaks away (an arrow Y23). Hereinafter, the voltage being applied to the electrode 32A as a result of the CPU 21 outputting the signal to the sensor chip 3A is also referred to as "the CPU 21 applies the voltage to the electrode 32A."

The measurement portion 31 outputs, to the main body 3B, a signal indicating the electric current value of the electric current flowing in accordance with the application of the voltage to the electrode 32A. The CPU 21 of the main body 3B can identify the concentration of oxygen that has broken away, in other words, can identify the concentration of oxygen remaining in the containing solution 30, on the basis of the electric current value represented by the signal received from the sensor chip 3A. In other words, the measurement device 3 can identify a concentration change (the arrow Y22) of the oxygen in the containing solution 30 occurring due to the decomposition of the histamine (the arrow Y21), by measuring the electric current value of the electric current generated by electrolysis of the oxygen (an arrow Y23).

Note that the concentration of oxygen remaining in the containing solution 30 becomes smaller the more the histamine contained in the containing solution 30 decomposes due to the enzyme reaction. The concentration of the histamine contained in the containing solution 30 has a correlation with the electric current value of the electric current flowing in accordance with the application of the voltage to the electrode 32A. Thus, the CPU 21 can measure the concentration of the histamine contained in the containing solution 30, on the basis of the electric current value represented by the signal received from the sensor chip 3A. Hereinafter, acquiring the electric current value by receiving the signal from the sensor chip 3A can also be referred to as "the CPU 21 measures the electric current value of the electric current flowing in the electrode 32A."

Relationship Between Voltage and Electric Current at Time of Applying Voltage

The concentration of oxygen in the containing solution 30 changes in accordance with the oxygen in the containing solution 30 being consumed by the enzyme reaction (the arrow Y22) and electrolysis (the arrow Y23). An electric current value I of the electric current flowing when the oxygen is electrolyzed can be derived as in Formula (1-1), using the simplified Butler-Volmer equation. In other words, the electric current value I is proportional to a concentration C of the oxygen in the containing solution 30.

$$I \propto C\beta(e^{\alpha V}-1) \tag{1-1}$$

Note that in Formula (1-1), V indicates the voltage applied to the electrode 32A. A coefficient $\alpha$ is a coefficient that varies in accordance with electrolysis activity. On the other hand, a coefficient $\beta$ is a coefficient of proportionality that varies in accordance with a surface area of the electrode 32A and other properties.

Figure 4:
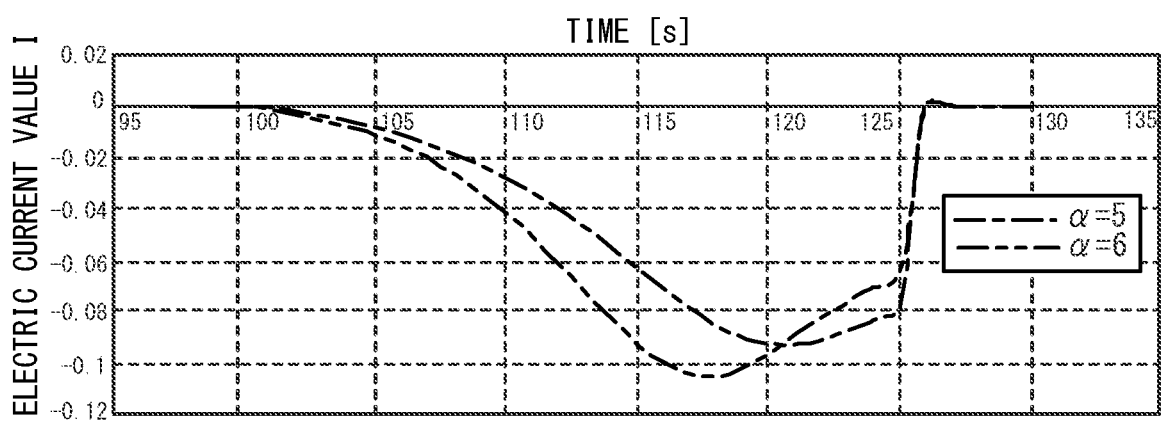
FIG. 4 is a graph ($\alpha$=5, 6) obtained by simulation showing changes over time of an electric current flowing when sweeping a voltage of an electrode.
Figure 5:
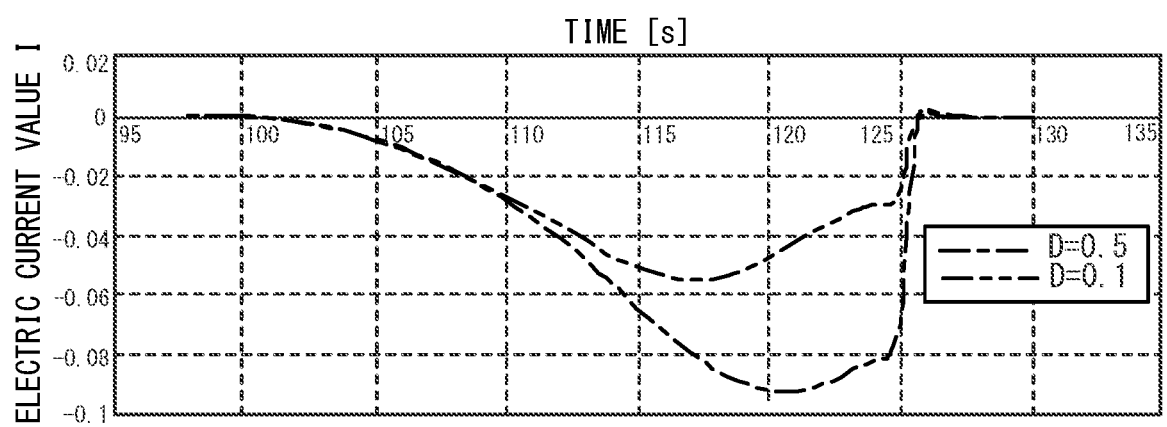
FIG. 5 is a graph (D=0.5, 0.1) obtained by simulation showing changes over time of the electric current flowing when sweeping the voltage of the electrode.

Peak values of the electric current value I of the electric current flowing when the voltage applied to the electrode 32A is caused to sweep at 40 mV/s were compared for each of values of the coefficient $\alpha$, and a diffusion coefficient D of the oxygen in the containing solution 30, respectively. Note that the diffusion coefficient D has a correlation with the concentration C of oxygen in the containing solution 30. FIG. 4 and FIG. 5 are graphs derived by simulation of the electric current value I of the electric current flowing when the sweep voltage is applied to the electrode 32A. A specific method of simulation will be described later. As shown in FIG. 4, a significant difference does not occur between the peak values of the electric current value I when the coefficient $\alpha$ is 5 (a one-dot chain line) and when the coefficient $\alpha$ is 6 (a two-dot chain line). On the other hand, as shown in FIG. 5, a significant difference occurs between the peak values of the electric current value I when the diffusion coefficient D is 0.5 (a one-dot chain line) and when the diffusion coefficient D is 0.1 (a two-dot chain line).

Figure 6:
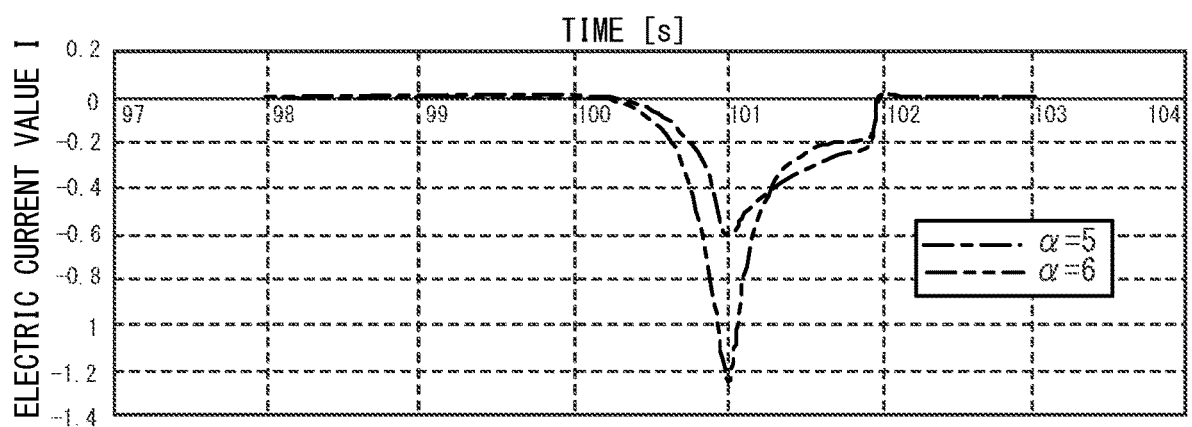
FIG. 6 is a graph ($\alpha$=5, 6) obtained by simulation showing changes over time of the electric current flowing when a pulse voltage is applied to the electrode.
Figure 7:
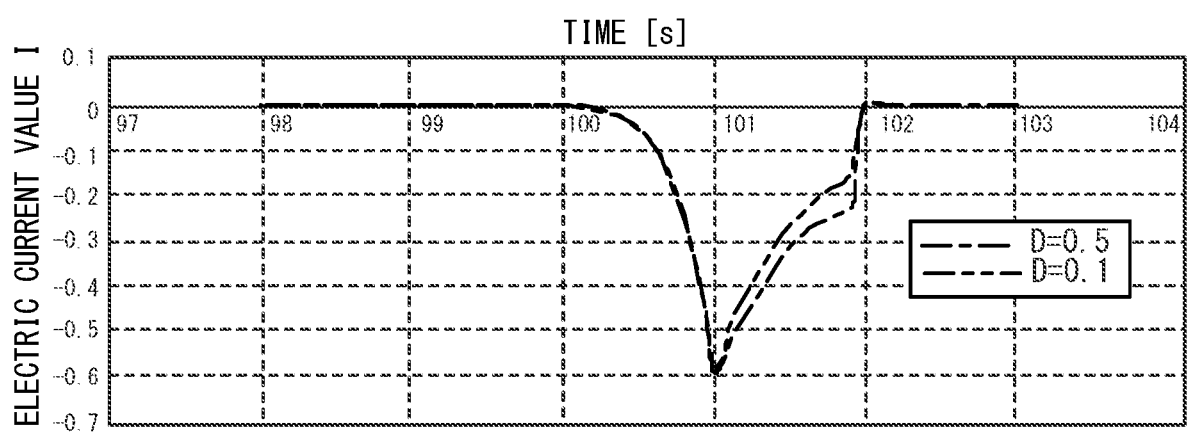
FIG. 7 is a graph (D=0.5, 0.1) obtained by simulation showing changes over time of the electric current flowing when the pulse voltage is applied to the electrode.

Further, for example, the peak values of the electric current value I of the electric current flowing when a pulse voltage is applied to the electrode 32A were compared for each of values of the coefficient $\alpha$ and the diffusion coefficient D. FIG. 6 and FIG. 7 are graphs derived by simulation of the electric current value I of the electric current flowing when the pulse voltage is applied to the electrode 32A. As shown in FIG. 6, a significant difference occurs between the peak values of the electric current value I when the coefficient $\alpha$ is 5 (a one-dot chain line) and when the coefficient $\alpha$ is 6 (a two-dot chain line). On the other hand, as shown in FIG. 7, a significant difference does not occur between the peak values of the electric current value I when the diffusion coefficient D is 0.5 (a one-dot chain line) and when the diffusion coefficient D is 0.1 (a two-dot chain line).

When the electric current value I differs due to variations in the coefficient $\alpha$ and the diffusion coefficient D, it is necessary to perform a calculation for converting the electric current value I into the concentration of oxygen for each combination of the coefficient $\alpha$ and the diffusion coefficient D, and this is complex. Further, the fact that the electric current value I differs as a result of the coefficient $\alpha$, the diffusion coefficient D, a state of the surface of the electrode 32A that is the working electrode, and other variations is a cause of deterioration in accuracy when determining the histamine concentration from the electric current value I in the measurement device 3. Thus, in the present embodiment, the CPU 21 determines the histamine concentration by performing the following main processing.

Main Processing

The main processing performed by the CPU 21 of the measurement device 3 will be described with reference to FIG. 8. The CPU 21 starts the main processing when a power supply of the measurement device 3 is turned on, by reading out and executing a program stored in the storage device 22.

First, the CPU 21 acquires a value 120 s input by a user, as a second elapsed time period Tp(2), via the input portion 24 (step S1). The second elapsed time period Tp(2) will be described in more detail later. Next, the CPU 21 judges whether the containing solution 30 has been dripped onto the electrode 32A by the user (step S11). Here, when the user has dripped the containing solution 30 onto the electrode 32A, at the same time as dripping the containing solution 30, the user performs, via the input portion 24, an input operation indicating that the dripping has been performed. When the CPU 21 does not detect the input operation via the input portion 24, the CPU 21 judges that the containing solution 30 has not been dripped onto the electrode 32A (no at step S11). In this case, the CPU 21 returns the processing to step S11, and continuously judges whether the containing solution 30 has been dripped onto the electrode 32A. On the other hand, when the CPU 21 has detected the input operation via the input portion 24, the CPU 21 judges that the containing solution 30 has been dripped onto the electrode 32A (yes at step S11). In this case, the CPU 21 advances the processing to step S13.

At a timing when it is judged that the containing solution 30 has been dripped onto the electrode 32A, more specifically, after 0.3 s (hereinafter referred to as a first elapsed time period Tp(1)) from a timing at which it is judged that the containing solution 30 has been dripped onto the electrode 32A, the CPU 21 applies a voltage of −600 mV (hereinafter referred to as a first voltage V(1)) to the electrode 32A for 0.5 s (hereinafter referred to as a first application time period Ta(1)) (refer to step S13 and FIG. 9). At this time, the oxygen in the containing solution 30 is consumed by electrolysis. Note that a time Tn required for a voltage of the electrode 32A to change from 0V to the first voltage V(1) is 0.3 s (refer to FIG. 9). Note also that the time Tn is not limited to the value (0.3 s) of the present embodiment, and is preferably any value from 0 s to 3 s. As described above, this is to suppress the consumption of the oxygen by electrolysis such that there is no impact on measurement accuracy.

Figure 9:
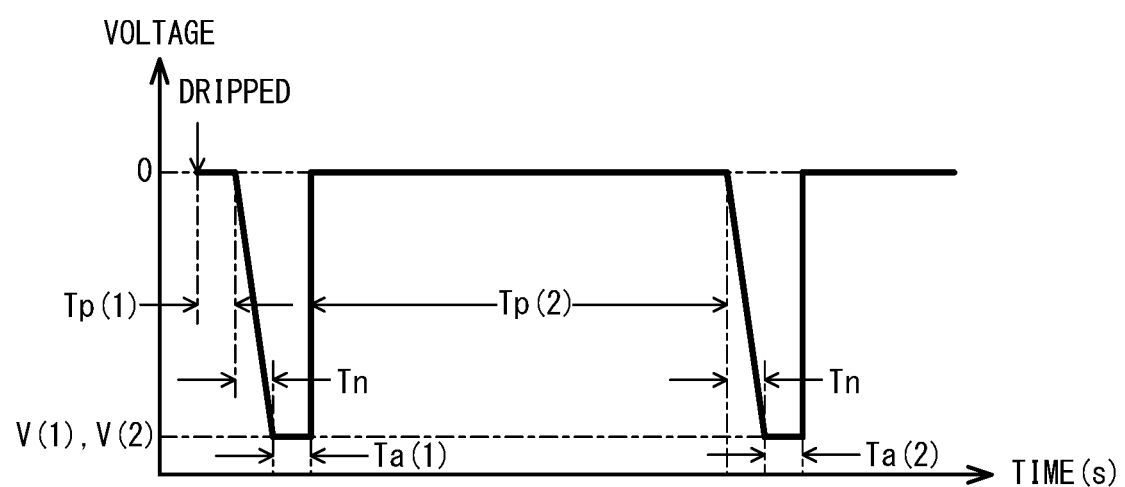
FIG. 9 is a graph showing changes over time of the voltage applied to the electrode 32A.

The first elapsed time period Tp(1) shown in FIG. 9, is prescribed in advance as a time period of a range with which the progress of a reaction over time occurring after the dripping of the containing solution 30 onto the electrode 32A does not impact the measurement accuracy. More specifically, the first elapsed time period Tp(1) is prescribed in advance as a time period after the containing solution 30 is dripped onto the electrode 32A and the decomposition reaction of the histamine by HOD formed as the enzyme membrane 10 on the electrode 32A has started. Note that the first elapsed time period Tp(1) is not limited to the value (0.3 s) of the present embodiment, and is preferably any value from 0 s to 30 s.

Further, the first voltage V(1) and the first application time period Ta(1) are prescribed in advance as values of a range such that an amount of oxygen lost due to electrolysis occurring due to the application of the voltage to the electrode 32A does not cause an impact on the measurement accuracy of the concentrations of oxygen and histamine. Note that only oxygen present at a boundary surface of the electrode 32A is lost due to the application of the voltage to the electrode 32A, the oxygen is diffused toward the electrode 32A due to the formation of a concentration gradient, and thus, the lost oxygen is recovered. More specifically, the first voltage V(1) and the first application time period Ta(1) are prescribed in advance as values with which the lost oxygen can be recovered, by oxygen supplied due to the diffusion. Note that the first voltage V(1) is not limited to the value (−600 mV) of the present embodiment, and is preferably any value from −1000 mV to −500 mV. The first application time period Ta(1) is not limited to the value (0.5 s) of the present embodiment, and is preferably any value from 0 s to 3 s.

Figure 8:
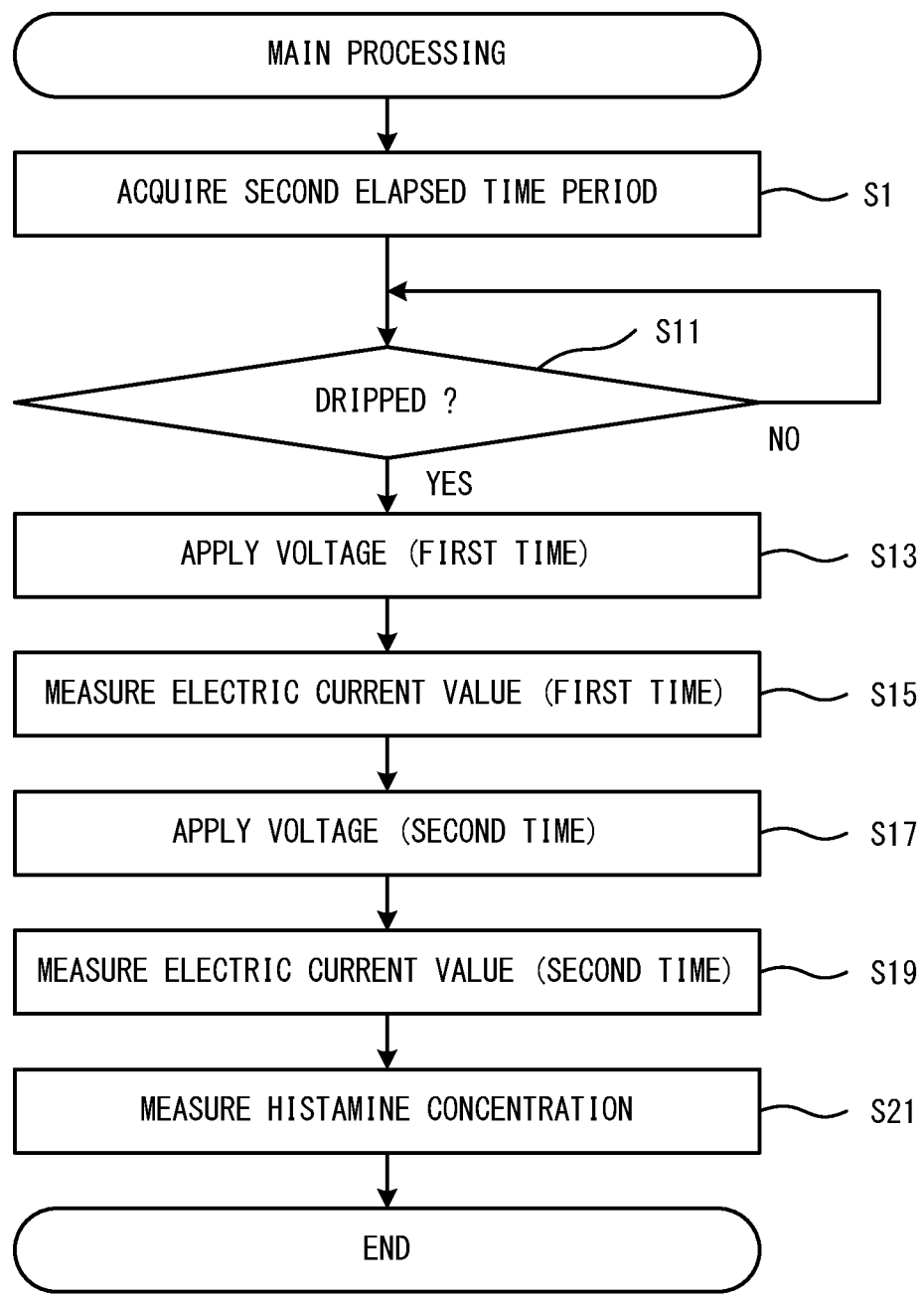
FIG. 8 is a flowchart of main processing.

As shown in FIG. 8, the CPU 21 measures the electric current value of the electric current flowing through the electrode 32A during a period in which the first voltage V(1) is applied to the electrode 32A by the processing at step S13 (step S15). The CPU 21 measures the electric current when the first voltage V(1) is applied to the electrode 32A, or measures an integrated value of the electric current flowing through the electrode 32A during the period over which the first voltage V(1) is applied, as a first electric current $i_0$, and stores the first electric current $i_0$ in the storage device 22.

After applying the first voltage V(1) to the electrode 32A by the processing at step S13, and after 120 s, which is acquired as the second elapsed time period Tp(2) by the processing at step S1, has elapsed, the CPU 21 applies a voltage to the electrode 32A under the same conditions as application conditions of the first voltage V(1). More specifically, the CPU 21 applies the voltage of −600 mV (hereinafter referred to as a second voltage V(2)) to the electrode 32A for 0.5 s (hereinafter referred to as a second application time period Ta(2)) (refer to step S17 and FIG. 9). At this time, the oxygen in the containing solution 30 is consumed by electrolysis. The second voltage V(2) and the second application time period Ta(2) are equivalent to the first voltage V(1) and the first application time period Ta(1) that are applied to the electrode 32 by the processing at step S13. Further, the time Tn required for the voltage of the electrode 32A to change from 0V to the second voltage V(2) is also 0.3 s, and is equivalent to when the first voltage V(1) is applied to the electrode 32A by the processing at step S13 (refer to FIG. 9).

Note that the first voltage V(1) and the second voltage V(2) may differ from each other. In this case, the second voltage V(2) is not limited to the value (−600 mV) of the present embodiment, and is preferably any value from −1000 mV to −500 mV. Further, the first application time period Ta(1) and the second application time period Ta(2) may differ from each other. In this case, the second application time period Ta(2) is not limited to the value (0.5 s) of the present embodiment, and is preferably any value from 0 s to 3 s. The time required for the voltage of the electrode 32A to change from 0V to the first voltage V(1) and the time required for the voltage of the electrode 32A to change from 0V to the second voltage V(2) may differ from each other.

The second elapsed time period Tp(2) shown in FIG. 9 is prescribed in advance as a time period until, after oxygen is lost due to electrolysis when the first voltage V(1) is applied to the electrode 32A (refer to step S13 in FIG. 8), the oxygen is supplied to the electrode 32A from the vicinity of the electrode 32A by a diffusion phenomenon based on the concentration gradient of the oxygen in the containing solution 30, and the oxygen concentration recovers to a level that does not have an impact on the measurement accuracy.

Figure 10:
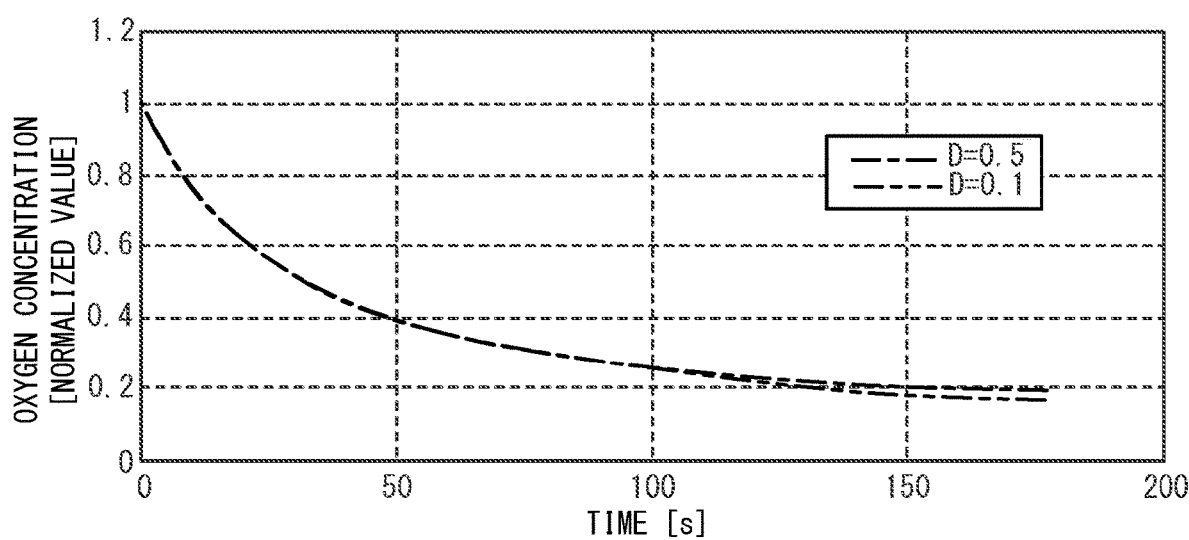
FIG. 10 is a graph obtained by simulation showing a state of an oxygen concentration falling when the voltage is applied to the electrode by processing at step S13.

FIG. 10 is a graph derived by simulation, of a relationship between an elapsed time period from immediately after the application of the first voltage V(1), and the oxygen concentration in the vicinity of the electrode 32A. From this graph, it is understood that during a period until approximately 120 s has elapsed from the application of the first voltage V(1) to the electrode 32A, the oxygen concentration has a tendency to decrease. On the other hand, it is understood that after approximately 120 s has elapsed from the application of the first voltage V(1) to the electrode 32A, the decreasing tendency in the oxygen concentration is suppressed, and the oxygen concentration becomes roughly level. In other words, as a result of 120 s elapsing from the application of the first voltage V(1) to the electrode 32A, the oxygen lost by electrolysis at the time of application of the first voltage V(1) is supplied to the electrode 32A by the diffusion phenomenon, and the oxygen concentration recovers to a level that does not have an impact on the measurement accuracy. Thus, in the present embodiment, 120 s is prescribed in advance as the second elapsed time period Tp(2). Note that the second elapsed time period Tp(2) is not limited to the value (120 s) of the present embodiment, and is preferably any value from 10 s to 600 s.

Note that an appropriate value of the second elapsed time period Tp(2) is also related to both the recovery of the oxygen loss due to the application of the voltage to the electrode 32A, and an extent of progress of the reaction. Therefore, the appropriate value of the second elapsed time period Tp(2) is decided by the user in accordance with the diffusion coefficient D, a membrane thickness of the enzyme membrane 10, and a rate of reaction by the enzyme.

In the above description, the user inputs, to the input portion 24 as the second elapsed time period Tp(2), the time period (hereinafter also referred to as a "recovery time period") until the oxygen concentration recovers in accordance with the diffusion phenomenon in the containing solution 30, after the loss of oxygen due to the application of the first voltage V(1) to the electrode 32A. In contrast to this, for example, when a time period until the decomposition reaction of the histamine ends up to a level that does not impact the measurement accuracy after the decomposition reaction of the histamine by the HOD formed as the enzyme membrane 10 on the electrode 32A has started (hereinafter referred to as a "convergence time period") is longer than the recovery time period, the user may input the convergence time period to the input portion 24 as the second elapsed time period Tp(2).

Figure 11:
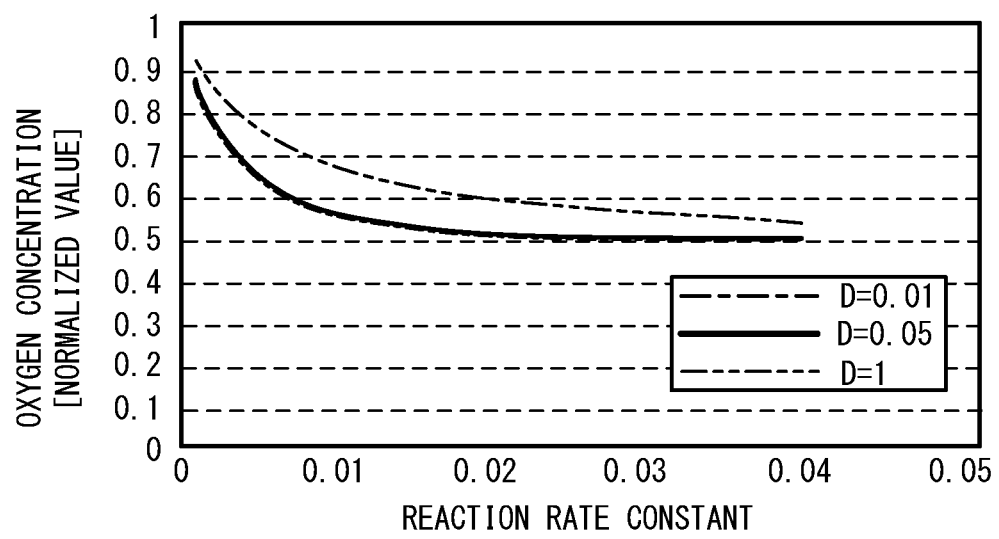
FIG. 11 is a graph obtained by simulation showing a relationship between the oxygen concentration and a reaction rate when the voltage is applied to the electrode by the processing at step S13.

A reason for using the convergence time period as the second elapsed time period Tp(2) in place of the recovery time period is as follows. FIG. 11 is a graph derived by simulation of a relationship between a reaction rate constant indicating the rate of reaction of the enzyme, and a normalized value of the oxygen concentration after 300 s has elapsed from the application of the first voltage V(1). From this graph, it is understood that, excluding when the diffusion coefficient is extremely large at D=1, when D=0.01 and 0.05, the change tendencies of each are aligned, and for both, the oxygen concentration converges when the rate of reaction is at a certain level or above. In other words, depending on the rate of reaction of the oxygen, even after the recovery time period has elapsed based on the assumption of the diffusion phenomenon of the oxygen, the oxygen concentration does not converge. Thus, when the convergence time period is longer than the recovery time period, by using the convergence time period as the second elapsed time period Tp(2) in place of the recovery time period, since it is possible to stand by until the decomposition reaction ends to a level that does not impact on the measurement accuracy, it is possible to improve the measurement accuracy.

As shown in FIG. 8, the CPU 21 measures the electric current value of the electric current flowing through the electrode 32A during the period in which the second voltage V(2) is applied to the electrode 32A by the processing at step S17 (step S19). The CPU 21 measures and stores, in the storage device 22, as a second electric current i, the electric current when the second voltage V(2) is applied to the electrode 32A, or an integrated value of the electric current flowing through the electrode 32A during the period in which the second voltage V(2) is applied to the electrode 32A.

Figure 12:
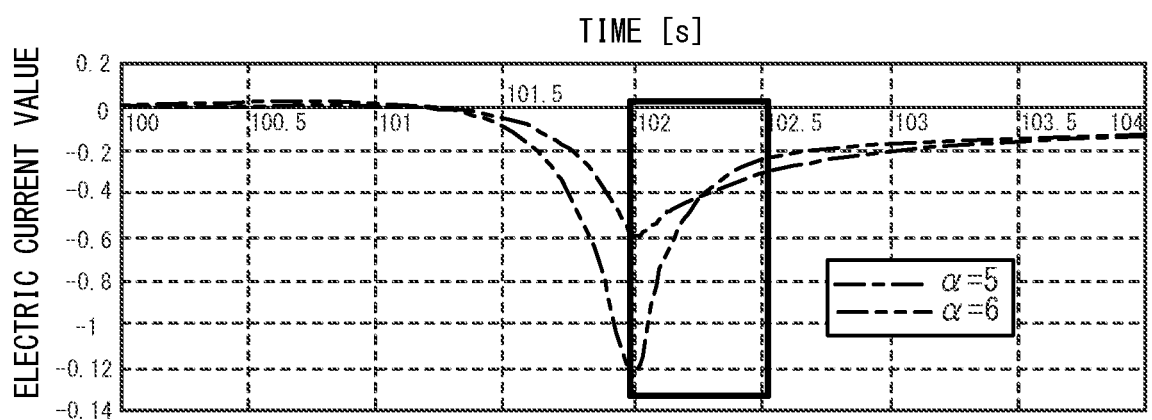
FIG. 12 is a graph ($\alpha$=5, 6) obtained by simulation showing changes over time of the electric current flowing when the voltage is applied to the electrode by processing at step S17.
Figure 13:
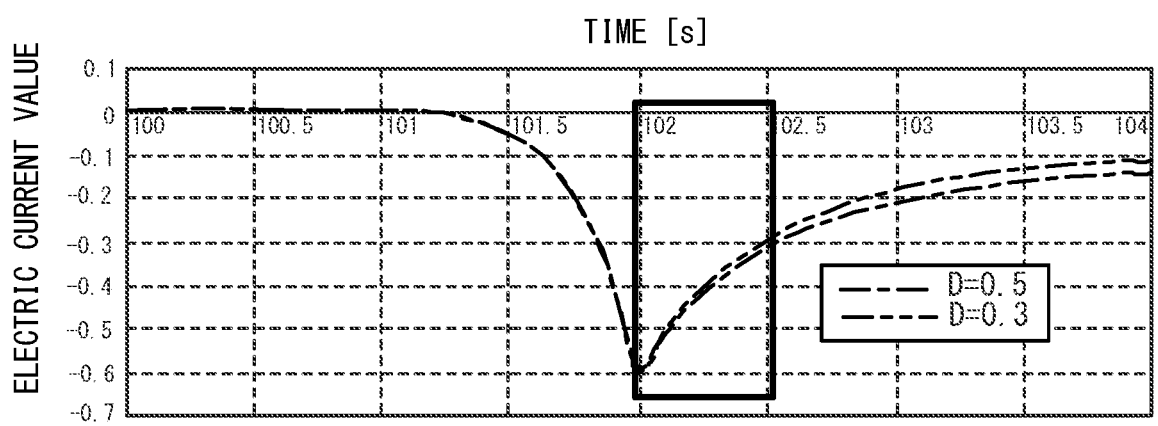
FIG. 13 is a graph (D=0.5, 0.3) obtained by simulation showing changes over time of the electric current flowing when the voltage is applied to the electrode by the processing at step S17.

FIG. 12 and FIG. 13 are graphs derived by simulation of the electric current value of the electric current flowing when the voltage is applied to the electrode 32A by the processing at step S17. For example, the CPU 21 measures, as the second electric current i, an integrated value of the electric current measured inside bold lines. Here, in the case of FIG. 12, in contrast to the case in FIG. 13, the peak value of the electric current significantly differs depending on a difference in the coefficient α. In contrast, in the present embodiment, by measuring the integrated value of the electric current as the second electric current i, the difference in the peak value of the electric current depending on the difference of the coefficient α is minimized.

As shown in FIG. 8, the CPU 21 reads out and acquires, from the storage device 22, the first electric current $i_0$ measured by the processing at step S15, and the second electric current i measured by the processing at step S19. By normalizing the second electric current i using the following method, using the first electric current $i_0$, the CPU 21 can accurately measure the concentration of the histamine in the containing solution 30 (step S21).

The oxygen concentration when the first voltage V(1) is applied is denoted by $c_0$, and the oxygen concentration when the second voltage V(2) is applied is denoted by c. Further, a ratio of the concentration c to the concentration $c_0$ is denoted by Rc. In this case, the ratio Rc is denoted by $c/c_0$ (Rc=$c/c_0$). Further, on the basis of Formula (1-1), the first electric current $i_0$ and the second electric current i can respectively be expressed as in Formulas (1-2) and (1-3).

$$i_0 \propto c_0 \beta(e^{\alpha V}-1) \tag{1-2}$$

$$i_0 \propto c \beta(e^{\alpha V}-1) \tag{1-3}$$

On the basis of Formulas (1-2) and (1-3), the ratio Rc can be expressed as in Formula (1-4).

$$Rc = \frac{c\beta(e^{\alpha V}-1)}{c_0 \beta(e^{\alpha V}-1)} = \frac{c}{c_0} = \frac{i}{i_0} \tag{1-4}$$

In Formula (1-4), the measurement of the first electric current $i_0$ and the second electric current i is performed using the same sample and the same electrode, and, since each of the coefficients α and β are equal to each other, the coefficients α and β in Formula (1-1) are eliminated. This indicates that even when an extent of electrolysis activity (the coefficient α), or the coefficient β differ per measurement, by calculating the ratio Rc (=$i/i_0$) of the second electric current i with respect to the first electric current $i_0$, the ratio Rc (=$c/c_0$) of the concentration of oxygen can be accurately determined. Note that, as described above, since there is a correlation between the oxygen concentration and the histamine concentration by accurately measuring the ratio Rc of the oxygen concentration, it is also possible to accurately measure the histamine concentration.

Figure 14:
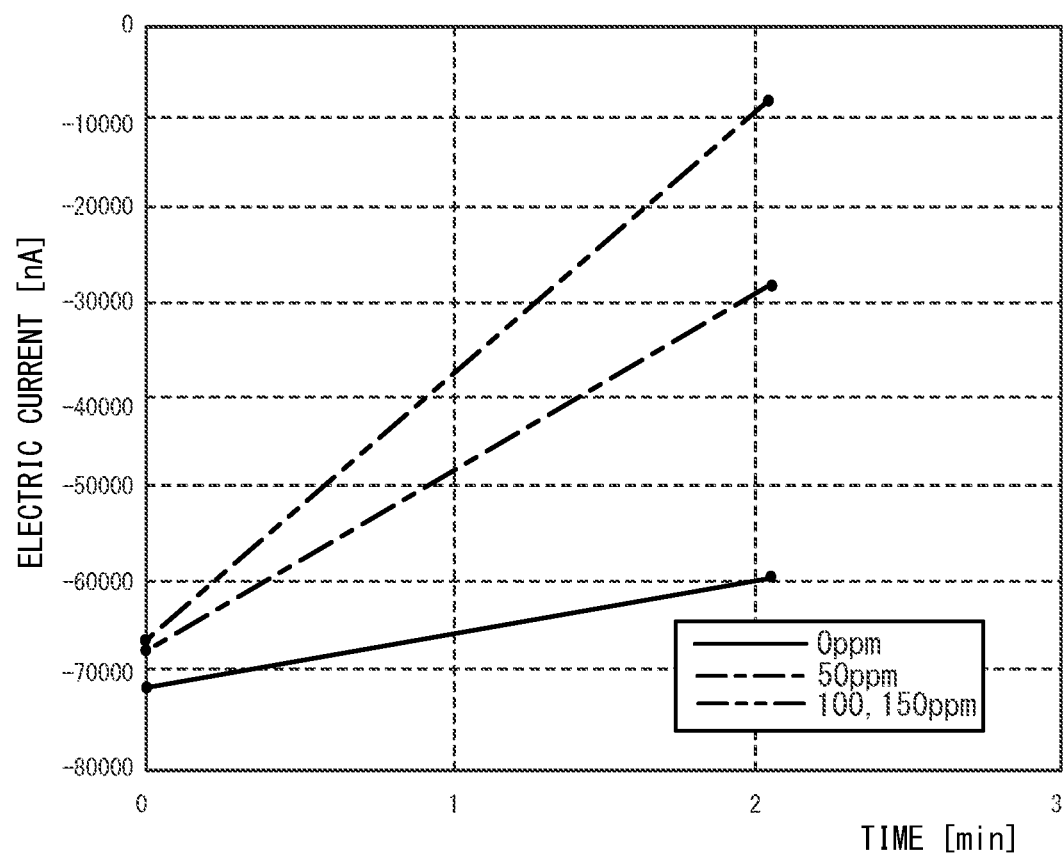
FIG. 14 is a graph obtained using actual measured data showing, for each of concentrations of histamine, a relationship between a first electric current $i_0$ and a second electric current i.

FIG. 14 is a graph showing measurement results indicating the relationship between the first electric current $i_0$ (the electric current at zero minutes) and the second electric current i (the electric current at two minutes) for each of concentrations of histamine (0 ppm, 50 ppm, 100 ppm, and 150 ppm). More specifically, FIG. 14 is an electric current value graph obtained when a rectangular wave of −600 mV is applied two times to a sample of canned tuna in water to which histamine is not added, and to samples to which histamine is added equivalent to 50 ppm, equivalent to 100 ppm, and equivalent to 150 ppm. As shown in FIG. 14, the value of the first electric current $i_0$ is substantially constant (approximately −70000 nA) regardless of the concentration of histamine. On the other hand, the value of the second electric current i is approximately −60000 nA when the histamine concentration is 0 ppm, is approximately −30000 nA when the histamine concentration is 50 ppm, and is approximately −10000 nA when the histamine concentrations are 100 ppm and 150 ppm. In other words, in this example, the second electric current i is a value that depends on the histamine concentration, at least in a range in which the histamine concentration is from 0 ppm to 100 ppm.

Figure 15:
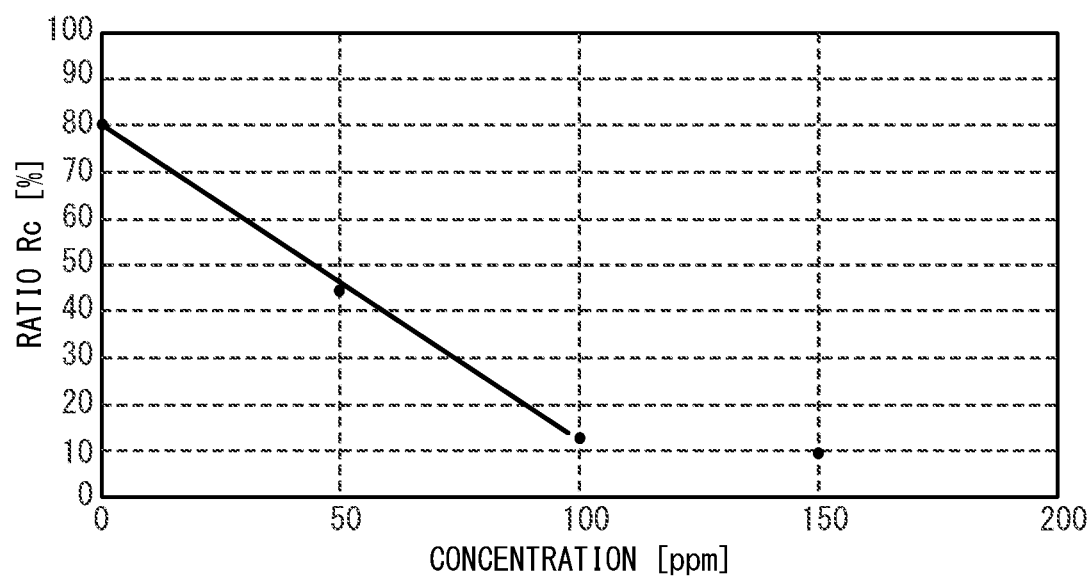
FIG. 15 is a graph obtained using actual measured data showing a relationship between a ratio Rc and the histamine concentration.
Figure 16A:
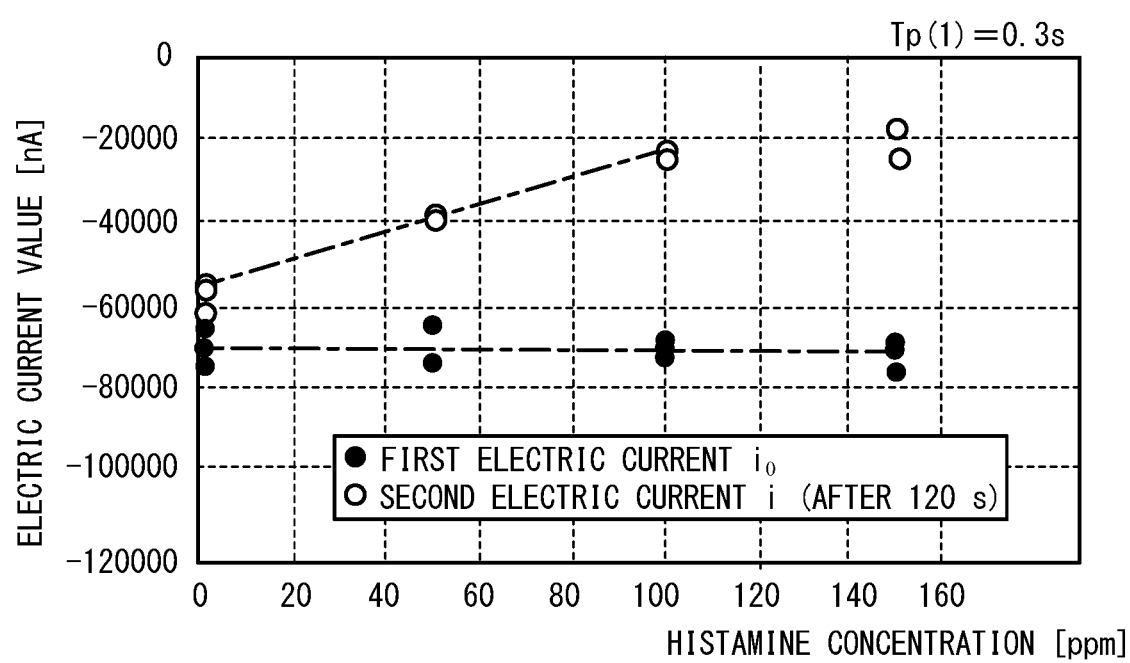
FIG. 16A is a graph obtained using actual measured data showing relationships between the histamine concentration and the first electric current $i_0$ and the second electric current i.
Figure 16B:
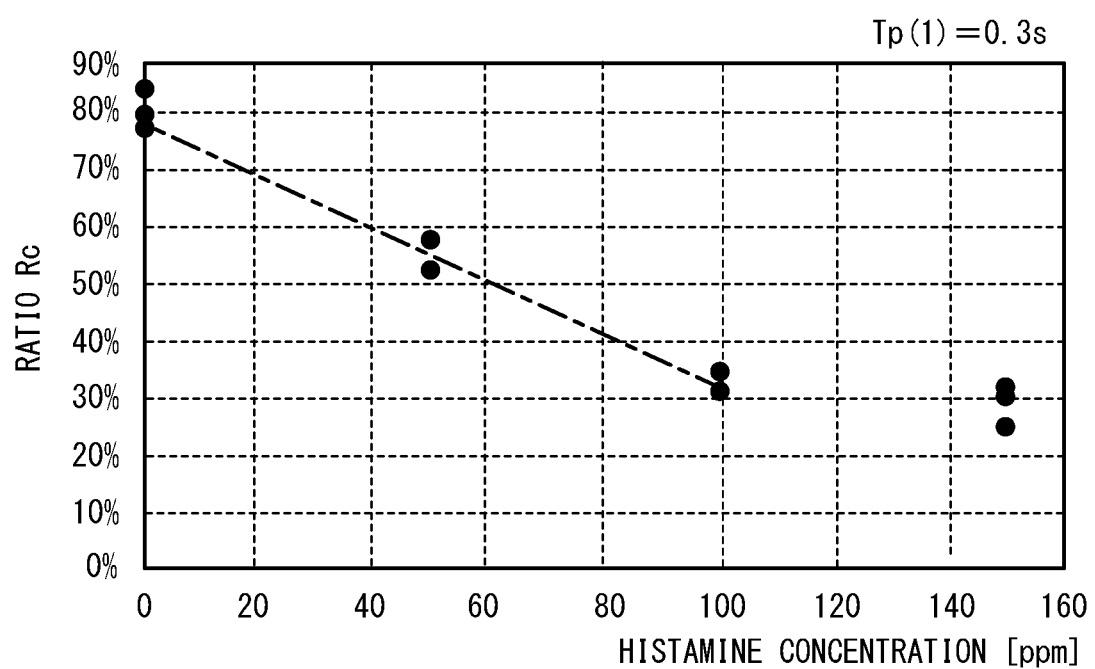
FIG. 16B is a graph obtained using actual measured data showing a relationship between the histamine concentration and the ratio Rc (where a first elapsed time period Tp(1) is 0.3 s)
Figure 17A:
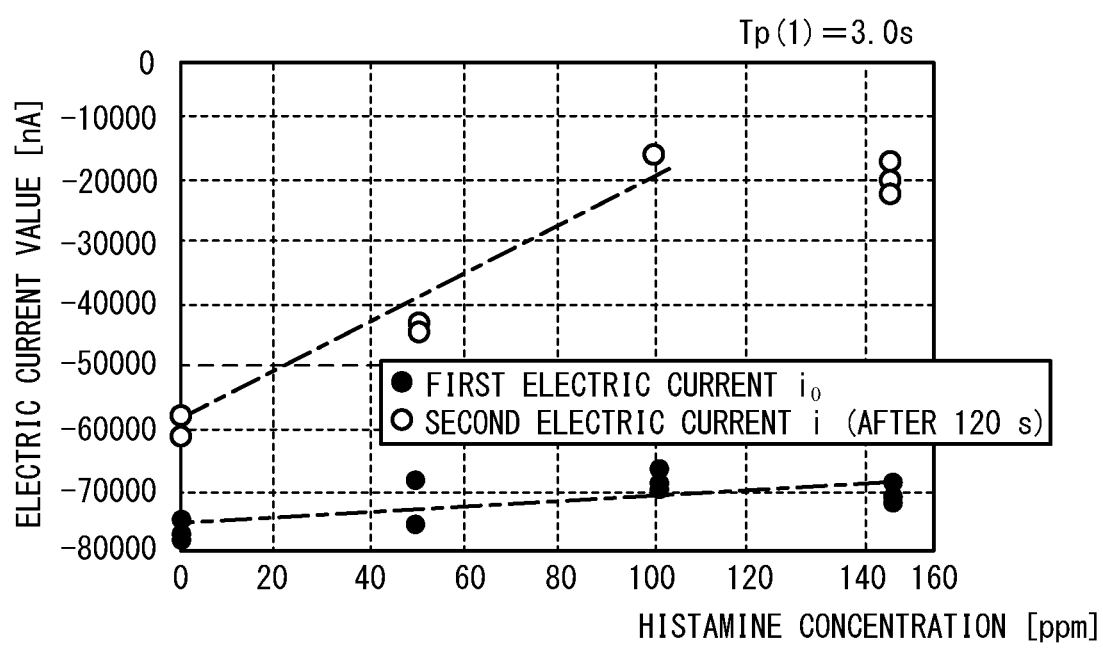
FIG. 17A is a graph obtained using actual measured data showing the relationships between the histamine concentration and the first electric current $i_0$ and the second electric current i.
Figure 17B:
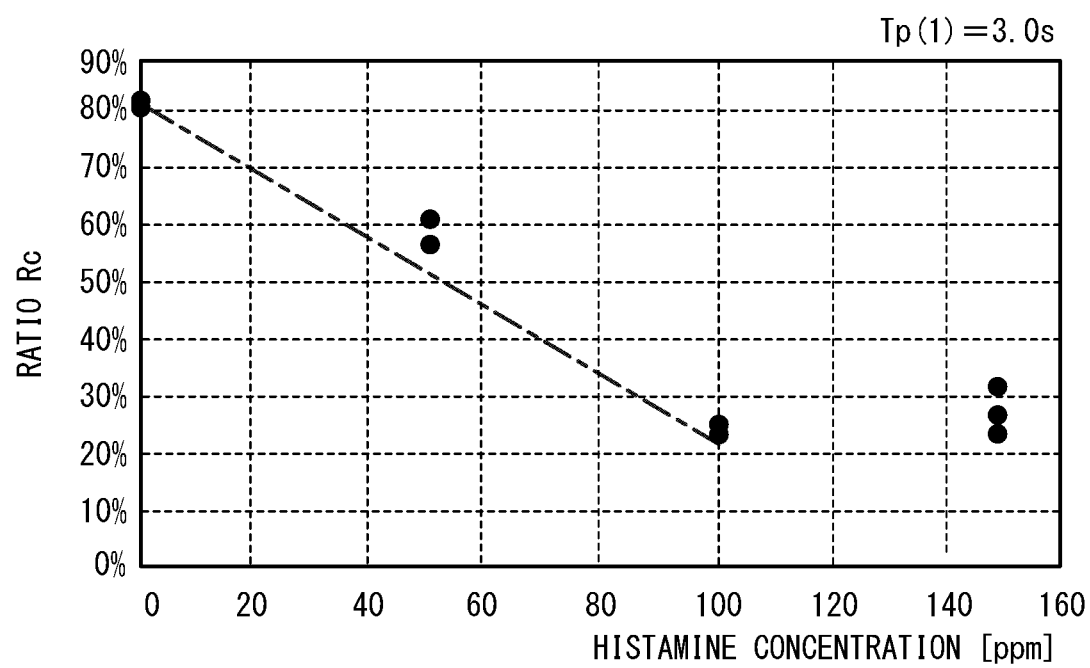
FIG. 17B is a graph obtained using actual measured data showing the relationship between the histamine concentration and the ratio Rc (where the first elapsed time period Tp(1) is 3.0 s)
Figure 18A:
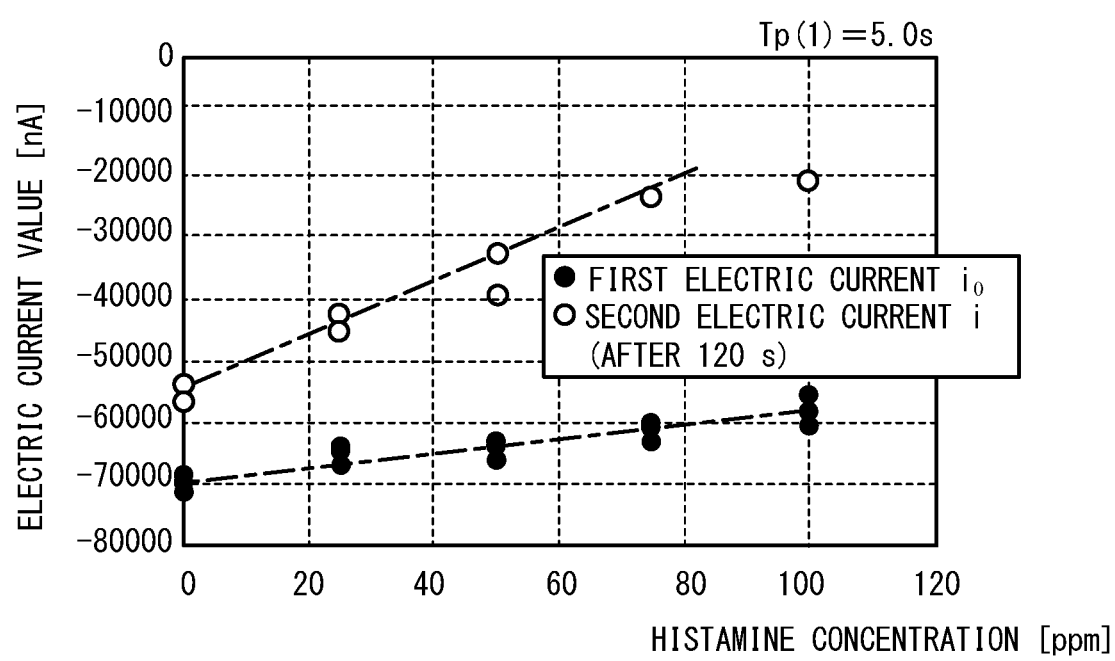
FIG. 18A is a graph obtained using actual measured data showing the relationships between the histamine concentration and the first electric current $i_0$ and the second electric current i.
Figure 18B:
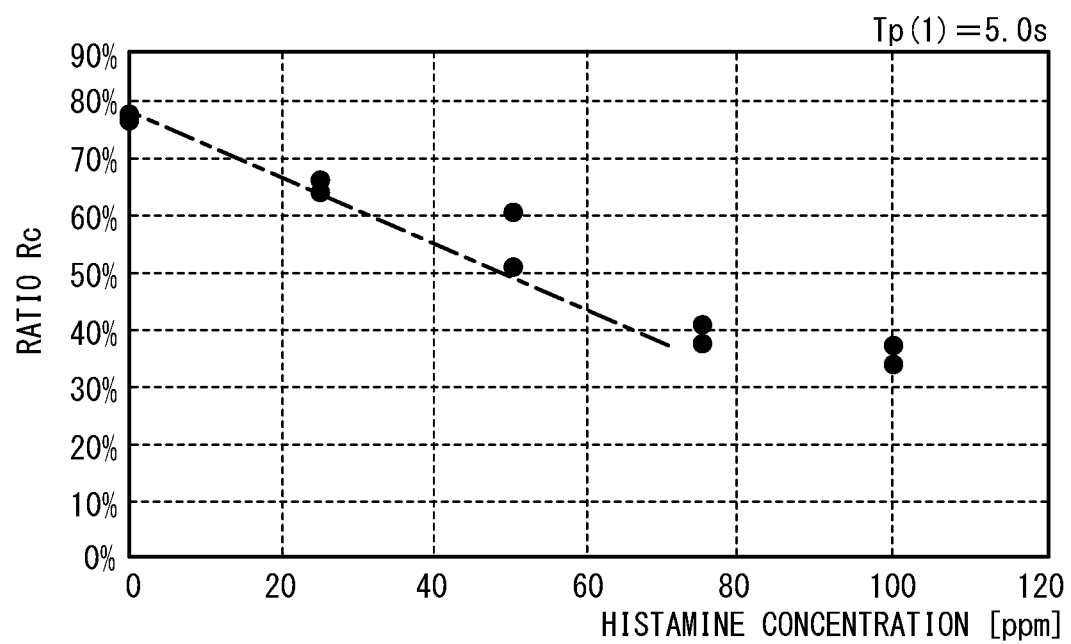
FIG. 18B is a graph obtained using actual measured data showing the relationship between the histamine concentration and the ratio Rc (where the first elapsed time period Tp(1) is 5.0 s)

FIG. 15 is a graph showing a relationship between the ratio Rc ($=i/i_0$) and the histamine concentration (0 ppm, 50 ppm, 100 ppm, and 150 ppm). More specifically, FIG. 15 is a graph showing the ratio Rc calculated on the basis of the electric current value obtained when the rectangular wave of −600 mV is applied two times to a sample of canned tuna in water to which histamine is not added, and to samples to which histamine added equivalent to 50 ppm, equivalent to 100 ppm, and equivalent to 150 ppm. As shown in FIG. 15, the relationship between the histamine concentration and the ratio Rc is linear in the range in which the histamine concentration is from 0 ppm to 100 ppm. Thus, if a function indicating the relationship between the histamine concentration and the ratio Rc is defined in advance, it is possible to identify the histamine concentration on the basis of the measured ratio Rc. Therefore, the measurement device 3 stores, in advance in the storage device 22, a linear function f indicating the relationship between the histamine concentration and the ratio Rc in the range of the histamine concentration from 0 ppm to 100 ppm. Note that, by optimizing the membrane thickness of the enzyme membrane 10, a bulk density of the enzyme membrane 10, the enzyme activity of the enzyme membrane 10, and the like, it is possible to expand the range of the histamine concentration that can be measured.

In the processing at step S21 of the main processing shown in FIG. 8, the CPU 21 calculates the ratio Rc ($=i/i_0$) obtained by dividing the second electric current i by the first electric current $i_0$, on the basis of the first electric current $i_0$ and the second electric current i acquired from the storage device 22. By applying the calculated ratio Rc to the linear function f stored in the storage device 22, the CPU 21 determines the histamine concentration. In this way, regardless of the coefficients α and β of the containing solution 30, it is possible to accurately measure the histamine concentration. The CPU 21 ends the main processing.

Evaluation of Various Parameters

Figure 19A:
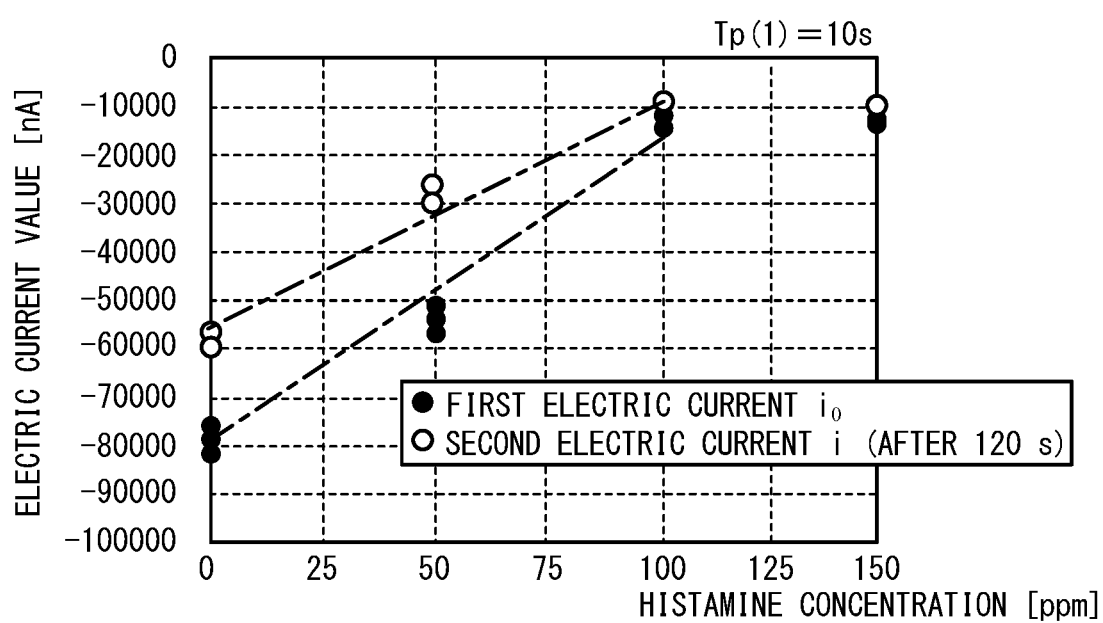
FIG. 19A is a graph obtained using actual measured data showing the relationships between the histamine concentration and the first electric current $i_0$ and the second electric current i.
Figure 19B:
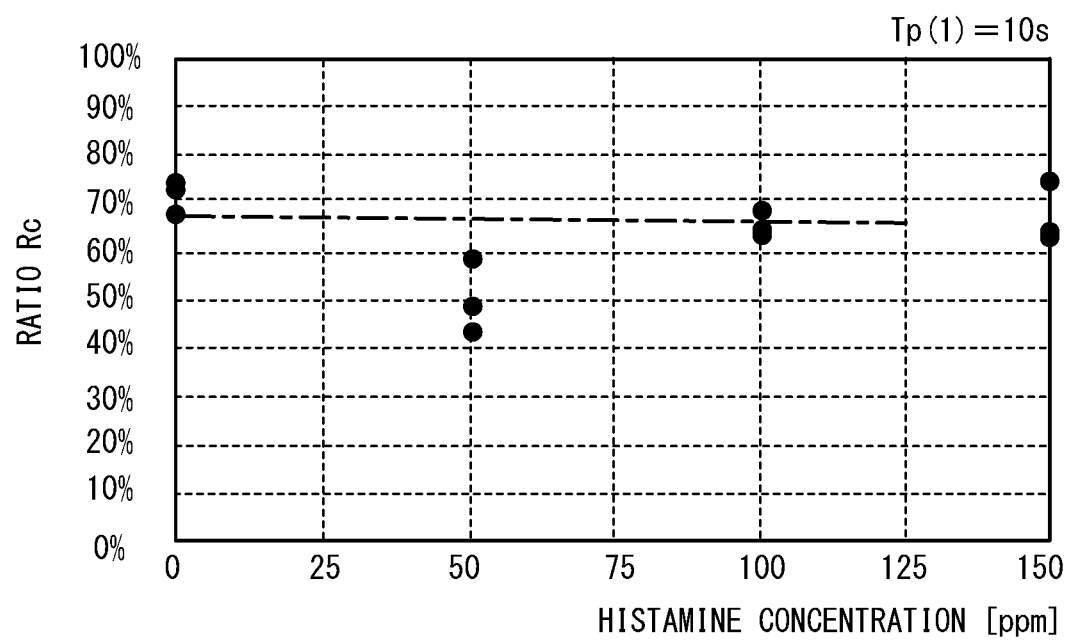
FIG. 19B is a graph obtained using actual measured data showing the relationship between the histamine concentration and the ratio Rc (B) (where the first elapsed time period Tp(1) is 10 s)

FIG. 16A to FIG. 19B are graphs plotting integrated values of the first electric current $i_0$ and the second electric current i (refer to FIG. 16A to FIG. 19A) and plotting the ratio Rc ($=i/i_0$) (refer to FIG. 16B to FIG. 19B) when the first elapsed time period Tp(1) is 0.3 s (FIG. 16A, FIG. 16B), 3.0 s (FIG. 17A, FIG. 17B), 5.0 s (FIG. 18A, FIG. 18B), and 10 s (FIG. 19A, FIG. 19B). More specifically, FIG. 16A, FIG. 16B, FIG. 17A, FIG. 17B, and FIG. 19A, FIG. 19B are electric current value graphs obtained when the rectangular wave of −600 mV is applied two times to a sample of canned tuna in water to which histamine is not added, and to samples to which histamine added equivalent to 50 ppm, equivalent to 100 ppm, and equivalent to 150 ppm. FIG. 18A, FIG. 18B are an electric current value obtained when the rectangular wave of −600 mV is applied two times to a sample of canned tuna in water to which histamine is not added, and to samples to which histamine is added equivalent to 25 ppm, equivalent to 50 ppm, equivalent to 75 ppm, and equivalent to 100 ppm. Note that the second elapsed time period Tp(2) is set as 120 s.

As shown in FIG. 19A, when the first elapsed time period Tp(1) is 10 s, an extent of fluctuation of the first electric current $i_0$ resulting from the increase in the concentration of histamine in the containing solution 30 was greater compared to when the first elapsed time period Tp(1) is 0.3 s, 3.0 s, or 5.0 s (refer to FIG. 16A to FIG. 18A). Further, as shown in FIG. 19B, when the first elapsed time period Tp(1) is 10 s, an absolute value of a gradient of a linear curve that approximates the relationship between the histamine concentration and the ratio Rc ($=i/i_0$) was extremely small compared to when the first elapsed time period Tp(1) is 0.3 s, 3.0 s, or 5.0 s (refer to FIG. 16B to FIG. 18B), and is substantially zero.

From the above, it was clear that by causing the first elapsed time period Tp(1) to be at least any value inside a range of 0.3 s to 5.0 s, the histamine concentration can be appropriately identified on the basis of the value of the ratio Rc. On the other hand, it was understood that when the first elapsed time period Tp(1) is any value of 10 s or more, it is difficult to identify the histamine concentration on the basis of the ratio Rc. Further, it was clear that, in the present embodiment, a range of the first elapsed time period Tp(1), which is the elapsed time period from dripping the containing solution 30 onto the electrode 32A, and with which the progress of the histamine decomposition reaction over time does not impact on the measurement accuracy, is from 0.3 s to 5.0 s.

Figure 20:
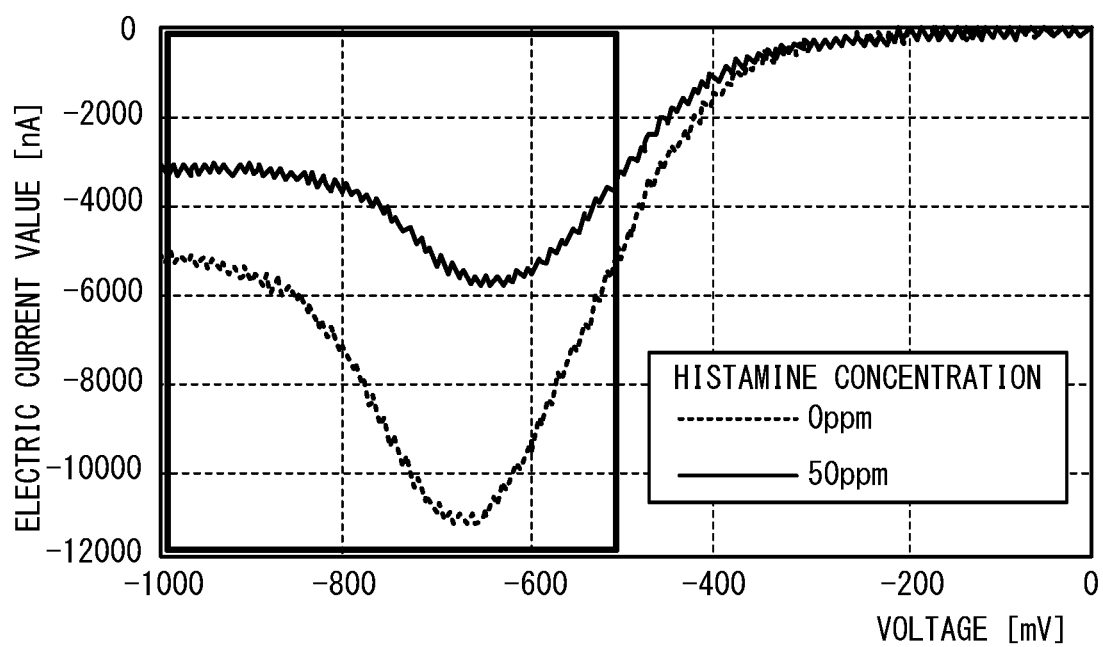
FIG. 20 is a graph obtained using actual measured data showing a relationship between a sweep voltage applied to the electrode and an electric current value of the electric current flowing in the electrode.

FIG. 20 is a graph plotting the electric current value flowing when the voltage applied to the electrode 32A is swept. More specifically, FIG. 20 is an electric current value graph when a voltage of 0 mV to −1000 mV is swept at −40 mV/sec with respect to a sample of canned tuna in water to which histamine is not added, and to a sample to which histamine is added equivalent to 50 ppm. As shown in FIG. 20, regardless of the concentration of the histamine in the containing solution 30 (0 ppm, 50 ppm), inside bold lines shown in FIG. 20, a peak in the electric current value caused by electrolysis of the oxygen was observed. From this result, it was understood that by causing a value of the first voltage V(1) and the second voltage V(2) applied to the electrode 32A to be greater than −500 mV, as an absolute value, it is possible to identify the concentration of the histamine using the electrolysis of oxygen.

Figure 21:
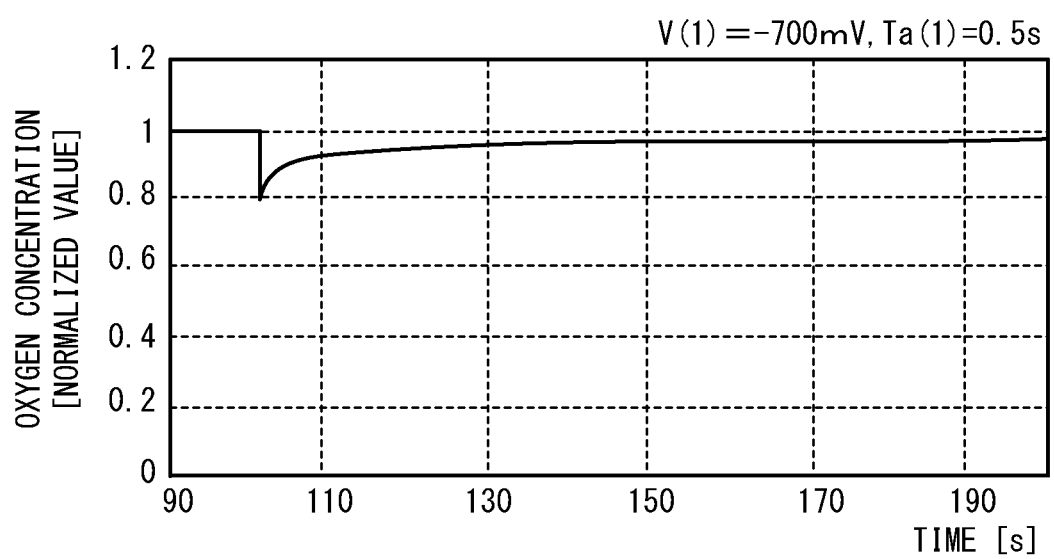
FIG. 21 is a graph obtained by simulation showing a relationship between an elapsed time period from the application of the voltage to the electrode and the oxygen concentration in the vicinity of the electrode (where a first voltage V(1) is −700 mV, and a first application time period Ta(1) is 0.5 s)
Figure 22:
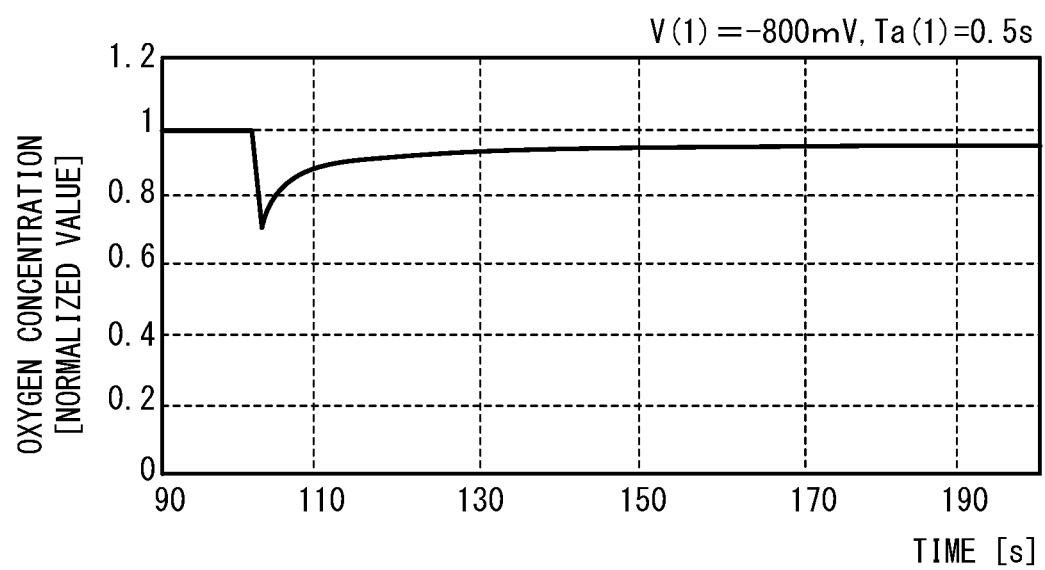
FIG. 22 is a graph obtained by simulation showing the relationship between the elapsed time period from the application of the voltage to the electrode and the oxygen concentration in the vicinity of the electrode (where the first voltage V(1) is −800 mV, and the first application time period Ta(1) is 0.5 s)
Figure 23:
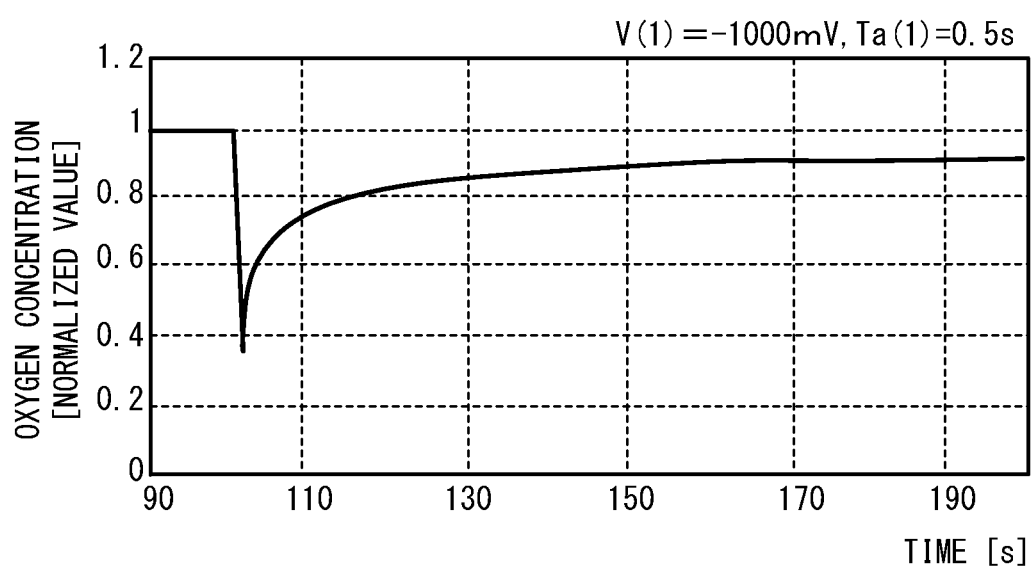
FIG. 23 is a graph obtained by simulation showing the relationship between the elapsed time period from the application of the voltage to the electrode and the oxygen concentration in the vicinity of the electrode (where the first voltage V(1) is −1000 mV, and the first application time period Ta(1) is 0.5 s)

FIG. 21 to FIG. 23 are graphs derived by simulation of changes over time of the oxygen concentration in the vicinity of the electrode 32A when the first voltage V(1) applied to the electrode 32A is −700 mV (refer to FIG. 21), −800 mV (refer to FIG. 22), and −1000 mV (refer to FIG. 23). Note that a time period over which each of the first voltages V(1) are applied to the electrode 32A (the first application time period Ta(1)) is 0.5 s in each case.

As shown in FIG. 21, when the first voltage V(1) is −700 mV, after approximately 30 s has elapsed from the application of the voltage, the oxygen concentration in the vicinity of the electrode 32A recovers to approximately 95% of the oxygen concentration before the application of the voltage. Thus, when the first voltage V(1) is −700 mV, a favorable recovery rate of the oxygen concentration in the vicinity of the electrode 32A is verified. On the other hand, as shown in FIG. 22, when the first voltage V(1) is −800 mV, the recovery rate of the oxygen concentration after approximately 30 s has elapsed from the application of the voltage is approximately 90%. Further, as shown in FIG. 23, when the first voltage V(1) is −1000 mV, the recovery rate of the oxygen concentration after approximately 30 s has elapsed from the application of the voltage is approximately 85%. Thus, it was understood that when the first voltage V(1) is greater than −800 mV, even when time elapses, an appropriate recovery rate of the oxygen concentration is not obtained. Note that the above-described results also apply, in a similar manner, to the second voltage V(2) when the voltage is applied to the electrode 32A for the second time and thereafter.

From these results, it was clear that the oxygen concentration in the vicinity of the electrode 32A can be favorably recovered by setting the first voltage V(1) and the second voltage V(2) to any one of values within a range of −600 mV to −800 mV, and thus, the histamine concentration can be appropriately identified on the basis of the measured electric current value. On the other hand, it was understood that when the first voltage V(1) and the second voltage V(2) are greater than −800 mV, the oxygen concentration in the vicinity of the electrode 32A cannot be favorably recovered, and thus, it is difficult to identify the histamine concentration on the basis of the measured electric current value. Further, it was clear that a range of the first voltage V(1) and the second voltage V(2) at which a decomposition amount of the oxygen due to the electrolysis does not impact on the measurement accuracy is from −600 mV to −800 mV.

Figure 24:
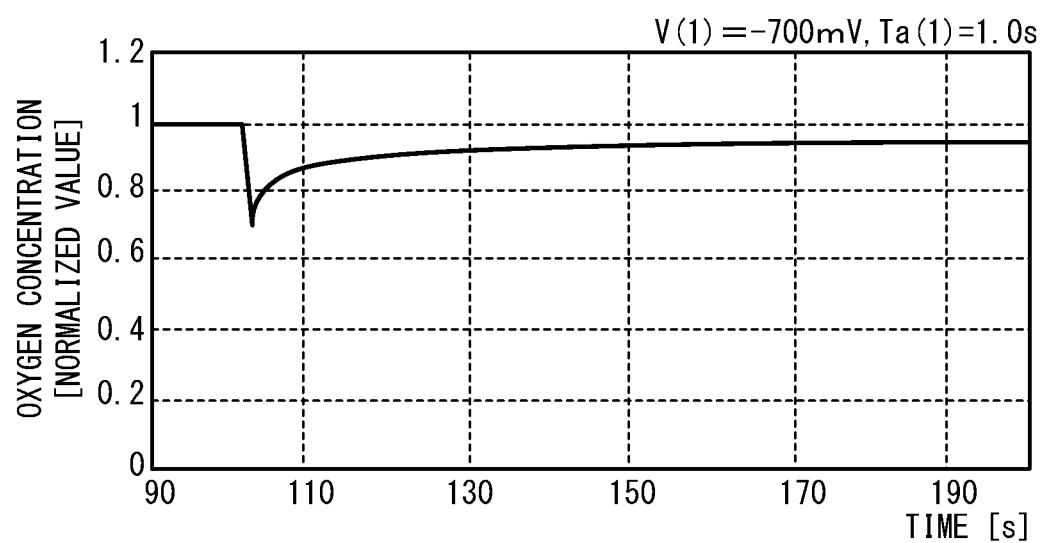
FIG. 24 is a graph obtained by simulation showing the relationship between the elapsed time period from the application of the voltage to the electrode and the oxygen concentration in the vicinity of the electrode (where the first voltage V(1) is −700 mV, and the first application time period Ta(1) is 1.0 s)

FIG. 24 is a graph derived by simulation of changes over time of the oxygen concentration in the vicinity of the electrode 32A when the first voltage V(1) applied to the electrode 32A is −700 mV. Note that a point of difference to FIG. 21 is that the time period over which the first voltage V(1) is applied to the electrode 32A (the first application time period Ta(1)) is 1.0 s.

As shown in FIG. 24, when the first application time period Ta(1) is 1.0 s, the recovery rate of the oxygen concentration after approximately 30 s has elapsed from the application of the voltage is approximately 90%. Thus, it was understood that when the first application time period Ta(1) is at least greater than 1.0 s, even when time elapses from the application of the first voltage V(1), it is not possible to favorably recover the oxygen concentration in the vicinity of the electrode 32A. Note that the above-described results also apply, in a similar manner, to the second application time period Ta(2) when the voltage is applied to the electrode 32A for the second time and thereafter.

From these results, it was clear that the oxygen concentration in the vicinity of the electrode 32A can be favorably recovered by setting the first application time period Ta(1) and the second application time period Ta(2) to any one of values within a range of 0.5 s to 1.0 s, and thus, the histamine concentration can be appropriately identified on the basis of the measured electric current value. On the other hand, it was understood that when the first application time period Ta(1) and the second application time period Ta(2) are greater than 1.0 s, the oxygen concentration in the vicinity of the electrode 32A cannot be favorably recovered, and thus, it is difficult to identify the histamine concentration on the basis of the measured electric current value. Further, it was clear that a range of the first application time period Ta(1) and the second application time period Ta(2), which are the respective application time periods of the first voltage V(1) and the second voltage V(2), that does not impact on the measurement accuracy is from 0.5 s to 1.0 s.

Figure 25:
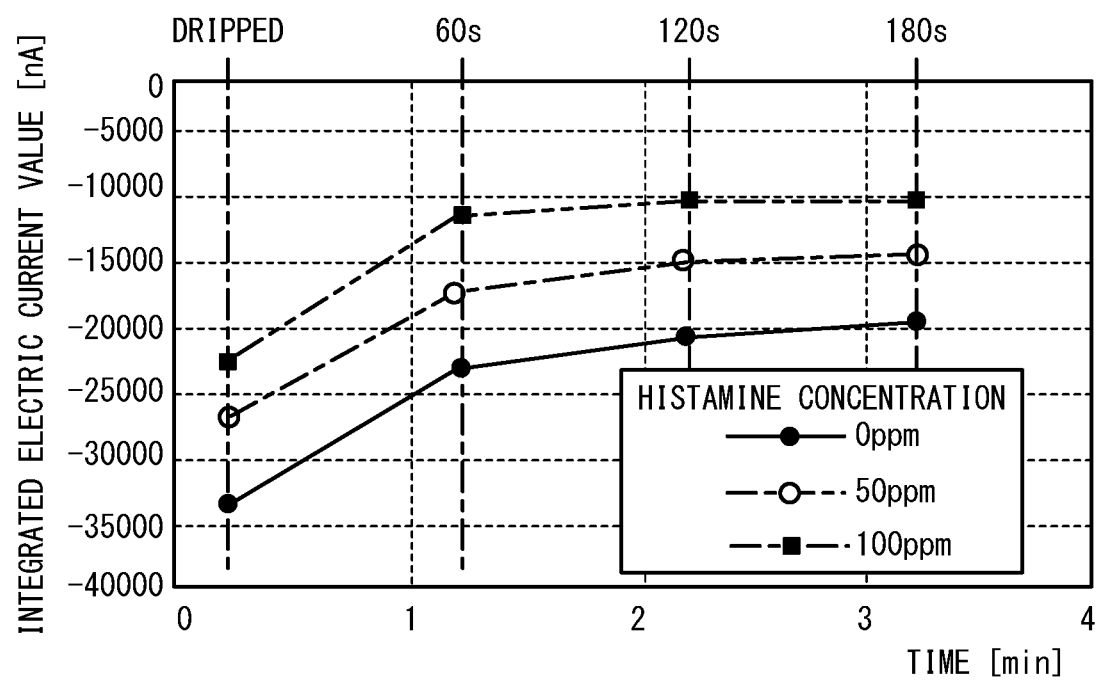
FIG. 25 is a graph obtained using actual measured data showing, for each of the concentrations of histamine, a relationship between the elapsed time period after the application of the first voltage V(1) and the measured second electric current i.

FIG. 25 is a graph showing, for each of histamine concentrations, the second electric current i measured in accordance with applying the second voltage V(2) (−600 mV) to the electrode 32A at each of timings after 60 s, 120 s, and 180 s have elapsed from the application of the voltage of the first voltage V(1). More specifically, FIG. 25 is an electric current value graph obtained by applying a rectangular wave of −600 mV four times at 60 second intervals, to a sample of canned tuna in water to which histamine is not added, and to samples to which histamine is added equivalent to 50 ppm and equivalent to 100 ppm.

As shown in FIG. 25, when the second voltage V(2) is applied after 120 s and 180 s have elapsed, the second electric current i is substantially the same. Thus, it was understood that the oxygen concentration in the vicinity of the electrode 32 is stabilized by setting the second elapsed time period Tp(2), which is the elapsed time period from the application of the first voltage V(1), to 120 s or more. Therefore, it was understood that, by setting the second elapsed time period Tp(2) to 120 s or more, the second electric current i can be accurately measured, and the histamine concentration can be accurately identified on the basis of this second electric current i. Further, it was clear that a range of the second elapsed time period Tp(2) with which the changes in the concentration of the oxygen in the vicinity of the electrode 32A due to the application of the first voltage V(1), after the first voltage V(1) has been applied, can be recovered by the diffusion of the oxygen to an extent that does not impact the measurement accuracy, is 120 s and above.

Simulation (Taking Oxygen Diffusion into Account)

The simulations for deriving the graphs shown in FIG. 4 to FIG. 7, FIG. 10, FIG. 12, and FIG. 13 will be described. Phenomena occurring as a result of applying the voltage to the electrode 32A can be broadly categorized into the following three phenomena:

- Oxygen and histamine are consumed by an enzyme reaction inside the enzyme membrane 10
- Histamine and oxygen are transported due to diffusion, toward the enzyme membrane 10 from around the enzyme membrane 10
- Oxygen is consumed by electrolysis at the electrode 32A, and the electric current flows on the basis of the electrolysis Each of the above-described three phenomena is formulated using the following methods.

Consumption Amount of Histamine and Oxygen by Enzyme Reaction

A simulation model targets only one dimension, that is, a direction (referred to as a y direction) orthogonal to a flat surface of the electrode 32A, where the electrode 32A is an origin point. It is assumed that there is no distribution of histamine and oxygen in other directions (an x direction, a z direction).

In a small region (volume $\Delta y \times 1 \times 1$) inside the enzyme membrane 10, a consumption amount of each of the histamine and oxygen consumed by the enzyme reaction can be expressed as follows, when the reaction is assumed to be a second order reaction.

Oxygen consumption amount: $-kHC\Delta y\Delta t$

Histamine consumption amount: $-\gamma kHC\Delta y\Delta t$

In the above, k is a reaction rate constant, H is a weight concentration of histamine, C is a weight concentration of oxygen, and γ is a mole molecular weight ratio of oxygen and histamine. Note that it is assumed that a solvent is water, and specific gravity is set to one.

Histamine and Oxygen Diffusion

Outside the enzyme membrane 10, concentrations of histamine and oxygen are maintained in an initial state. On the other hand, inside the enzyme membrane 10, histamine and oxygen are consumed by the enzyme reaction, and concentration distribution of histamine and oxygen occurs. Thus, movement of histamine and oxygen due to diffusion occurs. Here, in a similar manner to the "Consumption amount of histamine and oxygen by enzyme reaction," in the small region (volume $\Delta y \times 1 \times 1$) inside the enzyme membrane 10, diffusion of histamine and oxygen is considered.

First, the diffusion of oxygen is formulated as follows. According to Fick's First Law of diffusion, the diffusion is proportional to the concentration gradient and a diffusion area (unit amount 1), and can be expressed as follows. The diffusion coefficient is denoted by D, and a ratio between the diffusion coefficients of oxygen and histamine is denoted by g.

An amount of oxygen when oxygen flows into the small region, in which a mass balance is to be considered, can be expressed by Formula (2-1), and an amount of oxygen flowing out of the small region, in which the mass balance is to be considered, can be expressed by Formula (2-2). Note that in the following Formulas, a membrane thickness L of the enzyme membrane 10 is considered to be dimensionless.

$$-\frac{D}{L}\Delta t \frac{dC}{dy}\Big|_{y=y} \quad (2\text{-}1)$$

$$-\frac{D}{L}\Delta t \frac{dC}{dy}\Big|_{y=y+\Delta y} \quad (2\text{-}2)$$

Further, an increase and decrease amount in the small region, in which the mass balance is to be considered, due to the diffusion of oxygen can be expressed by Formula (2-3).

$$L\Delta y \Delta C \quad (2\text{-}3)$$

An amount of oxygen when histamine flows into the small region, in which the balance of resources is to be considered, can be expressed by Formula (2-4), and an amount of oxygen when histamine flows out of the small region, in which the balance of resources is to be considered, can be expressed by Formula (2-5).

$$-g\frac{D}{L}\Delta t \frac{dH}{dy}\Big|_{y=y} \quad (2\text{-}4)$$

$$-g\frac{D}{L}\Delta t \frac{dH}{dy}\Big|_{y=y+\Delta y} \quad (2\text{-}5)$$

Further, an increase and decrease amount in the small region, in which the mass balance is to be considered, due to the diffusion of histamine can be expressed by Formula (2-6).

$$L\Delta y \Delta H \quad (2\text{-}6)$$

Fundamental Equation

On the basis of Formulas (2-1) to (2-6), a fundamental equation will be described below that integrates the consumption amounts of histamine and oxygen (hereinafter collectively referred to as a target substance) due to the enzyme reaction and due to diffusion. The increase and decrease amounts of the target substance, the amount at the time of outflow due to the diffusion of the target substance, the amount at the time of inflow due to the diffusion of the target substance, and the consumption amount of the target substance due to the enzyme reaction satisfy a relationship of Formula (3) described below. Note that the increase and decrease amount of the target substance is denoted by increase/decrease amount. The amount at the time of outflow due to the diffusion of the target substance is denoted by diffusion outflow. The amount at the time of inflow due to the diffusion of the target substance is denoted by diffusion inflow. The consumption amount of the target substance due to the enzyme reaction of is denoted by reaction consumption amount.

Increase/decrease amount=diffusion outflow−diffusion inflow−reaction consumption amount (3)

When Formulas (2-1) to (2-3) for oxygen are applied to Formula (3), Formula (3-1) can be derived as a relational expression relating to oxygen.

$$L\Delta y \Delta C = -\frac{D}{L}\Delta t \frac{dC}{dy}\Big|_{y=y} + \frac{D}{L}\Delta t \frac{dC}{dy}\Big|_{y=y+\Delta y} - kLHC\Delta y\Delta t \quad (3\text{-}1)$$

By dividing both sides by $\Delta y\Delta t$, and setting a limit of zero for each of $\Delta y$ and $\Delta t$, Formula (3-2) can be derived.

$$\frac{\partial C}{\partial t} = \frac{D}{L^2}\frac{\partial^2 C}{\partial_y^2} - kHC \quad (3\text{-}2)$$

When Formulas (2-4) to (2-6) for histamine are applied to Formula (3), Formula (3-3) can be derived as a relational expression relating to histamine.

$$L\Delta y \Delta H = -g\frac{D}{L}\Delta t \frac{dH}{dy}\Big|_{y=y} + g\frac{D}{L}\Delta t \frac{dH}{dy}\Big|_{y=y+\Delta y} - \gamma kLHC\Delta y\Delta t \quad (3\text{-}3)$$

In a similar manner to the case of oxygen, by dividing both sides by $\Delta y\Delta t$, and setting a limit of zero for each of $\Delta y$ and $\Delta t$, Formula (3-4) can be derived.

$$\frac{\partial H}{\partial t} = g\frac{D}{L^2}\frac{\partial^2 H}{\partial_y^2} - \gamma kHC \quad (3\text{-}4)$$

Formulas (3-3) and (3-4) are simultaneous second order partial differential equations, and six boundary conditions are necessary in order to solve them. Further, they are extremely difficult to solve analytically. Thus, in the present embodiment, a numerical solution is employed.

Here, nondimensionalization is performed for $c=C/C_0$, $h=H/H_0$. $C_0$ is an initial concentration of oxygen, and $H_0$ is an initial concentration of histamine. Both sides of Formula (3-2) are divided by $H_0$, and Formula (3-5) is derived.

$$\frac{\partial c}{\partial t} = \frac{D}{L^2}\frac{\partial^2 c}{\partial y^2} - H_0 khc \quad (3\text{-}5)$$

Further, both sides of Formula (3-4) are divided by $C_0$, and Formula (3-6) is derived.

$$\frac{\partial h}{\partial t} = g\frac{D}{L^2}\frac{\partial^2 h}{\partial y^2} - C_0 \gamma khc \quad (3\text{-}6)$$

Formulas (3-5) and (3-6) are referred to as fundamental equations.

If, using the fundamental equations indicated by Formulas (3-5) and (3-6), the square of the membrane thickness of the enzyme membrane 10 and the diffusion coefficient have an inverse proportional relationship, the same equation, that is, the same solution is obtained. Thus, for example, when the target substance is present that cannot be measured since the diffusion coefficient is small, there is a case in which this can be dealt with by reducing the membrane thickness of the enzyme membrane 10.

Four boundary conditions indicated by Formulas (3-7) and (3-8) are established.

$$h|_{y=1} = c|_{y=1} = 1 \quad (3\text{-}7)$$

$$h|_{t=1} = c|_{t=1} = 1 \quad (3\text{-}8)$$

Electric Current of Electrolysis, and Boundary Conditions

The electric current flowing due to electrolysis of oxygen satisfies Formula (4-1), in accordance with the simplified Butler-Volmer equation.

$$I \propto c|_{y=0}\beta(e^{\alpha V} - 1) \quad (4\text{-}1)$$

In the vicinity of the electrode, in the small region in which the balance of resources is to be considered, when assuming that an oxygen amount shown by the right side of Formula (4-1) is consumed, Formulas (4-2) and (4-3) are satisfied.

$$\Delta y \Delta c = -c|_{y=0}\beta(e^{\alpha V} - 1)\Delta y \Delta t \quad (4\text{-}2)$$

$$\left.\frac{\partial c}{\partial t}\right|_{y=0} = -c|_{y=0}\beta(e^{\alpha V} - 1) \quad (4\text{-}3)$$

When the term for inflow due to diffusion is added to Formulas (4-2) and (4-3), Formula (4-4) is satisfied.

$$\left.\frac{\partial c}{\partial t}\right|_{y=0} = -\frac{D}{L}\left.\frac{\partial c}{\partial y}\right|_{y=0} - c|_{y=0}\beta(e^{\alpha V} - 1) \quad (4\text{-}4)$$

Formula (4-4) corresponds to the fifth boundary condition.

Next, if assuming that histamine is not electrolyzed when y=0, and histamine is not consumed by the enzyme on the electrode 32A, there is also no outflow due to diffusion, and thus, as the sixth boundary condition, Formula (4-5) can be derived.

$$\left.\frac{\partial h}{\partial t}\right|_{y=0} = 0 \quad (4\text{-}5)$$

Formulas (3-7), (3-8), (4-4), and (4-5) are simultaneous linear non-stationary second order partial differential equations, and are difficult to solve analytically. On the other hand, if a stationary state can be approximated, they can be solved.

Numerical Simulation

As a solution to differential equations, the Runge-Kutta methods are known, but for simplification in the present embodiment, a method will be employed assuming the simplest iterative method. The concentration of oxygen in the enzyme membrane 10 is denoted by C(t, x), for example. i is the argument indicating the number of t, and j is the argument indicating the number of x. Similarly, the concentration of histamine in the enzyme membrane 10 is denoted by H(t, x), for example. i is the argument indicating the number oft, and j is the argument indicating the number of x. In this case, time derivatives C' and H' relating to i-th C and H on the left side of the fundamental equation can be expressed by the following Formulas (5-1) and (5-2).

$$C' = C(i,j) - C(i-1,j) \quad (5\text{-}1)$$

$$H' = H(i,j) - C(i-1,j) \quad (5\text{-}2)$$

Next, second order derivative terms H" and C" relating to y on the right side of the fundamental equation can be expressed by the following Formulas (5-3) and (5-4).

$$C" = \{C(i-1,j+1) - C(i-1,j)\} - \{C(i-1,j) - C(i-1,j-1)\} = C(i-1,j+1) + C(i-1,j-1) - 2 \times C(i-1,j) \quad (5\text{-}3)$$

$$H" = H(i-1,j+1) + H(i-1,j-1) - 2 \times H(i-1,j) \quad (5\text{-}4)$$

By substituting each of these two formulas into the fundamental equation, and by substituting the appropriate parameters, C(i, j) and H(i, j) can be calculated.

Changes Over Time of Applied Voltage

A variable of the applied voltage is present in the fundamental equation, and when this V changing over time is denoted by a time variable V(t), it is possible to measure the oxygen concentration and the histamine concentration using a chosen V(t). Further, as described below, the electric current can be measured by the electrolysis of oxygen.

Measurement of Electric Current Flowing Due to Electrolysis of Oxygen

Using the Butler-Volmer equation, the electric current flowing due to the electrolysis of oxygen can be derived using Formula (4-1). According to this equation, if the concentration of oxygen on the electrode 32A and the coefficient $\alpha$ are known, the electric current can be measured. Note that the coefficient $\alpha$ fluctuates significantly not only depending on the physical properties of the electrode 32A, but also on the characteristics (the pH and the like) of the containing solution 30. On the other hand, according to the present embodiment, by calculating the ratio Rc, it is possible to eliminate the impact of the coefficient $\alpha$, and thus, the electric current value can be precisely identified and the histamine concentration can be accurately measured.

According to the above, a predictive calculation of the electric current actually measured at the time of electrolysis is also possible. Note that there are many cases in which it is difficult to set the actual Butler-Volmer constant and the diffusion coefficient, but the simulation using the above-described method is possible since a range of the parameters for reproducing, by the simulation, an electric current curve obtained by the actual experiment is an extremely narrow range.

Simulation (when not Considering Diffusion of Oxygen)

A simulation for deriving the graph shown in FIG. 11 will be described. In Formula (3-5), by ignoring the term relating to diffusion, Formula (6-1) is derived. Similarly, in Formula (3-6), by ignoring the term relating to diffusion, Formula (6-2) is derived.

$$\frac{\partial c}{\partial t} = -H_0 khc \quad (6\text{-}1)$$

$$\frac{\partial h}{\partial t} = -C_0 \gamma khc \quad (6\text{-}2)$$

Here, it is presumed that when one oxygen gas molecule is consumed, one histamine molecule reacts. In this case, when an oxygen molecule is denoted by MO, and a histamine molecule is denoted by Mh, a relationship between a histamine weight concentration H(t) and an oxygen weight concentration C(t) can be expressed by Formula (6-3).

$$H(t) = H_0 - (C_0 - C(t))\frac{M_h}{M_0} = H_0 - (C_0 - C(t))r \quad (6\text{-}3)$$

Next, normalization of Formula (6-4) is performed, and Formula (6-5) is derived.

$$h = \frac{H(t)}{H_0}, c = \frac{C(t)}{C_0} \quad (6\text{-}4)$$

$$h = 1 - \frac{C_0 r}{H_0}(1-c) \quad (6\text{-}5)$$

By substituting the calculated h into a differential equation, Formula (6-6) is derived.

$$\frac{dc}{dt} = -H_0 k\left\{1 - \frac{C_0 r}{H_0}(1-c)\right\}c = -H_0 kc + kC_0 r(c - c^2) \quad (6\text{-}6)$$

By analytically solving Formula (6-6), Formula (6-7) can be derived.

$$c = \frac{(C_0 r - H_0)e^{kt(C_0 r - H_0)}}{(2C_0 r - H_0) - C_0 r e^{kt(C_0 r - H_0)}} \quad (6\text{-}7)$$

Where $C_0 r > H$, by setting a limit of t to infinity, Formula (6-8) can be derived.

$$c = 1 - \frac{H_0}{C_0 r} \quad (6\text{-}8)$$

From Formula (6-8), it was understood that a convergence value of a normalized concentration c has a linear relationship with the initial histamine concentration $H_0$. For this linear relationship, the reaction must progress to a certain extent or more. In other words, the reaction must progress to a range where it does not impact on the measurement accuracy. Here, a time t is always multiplied by k, and thus, with respect to the time required for the reaction to progress to the range where it does not impact on the measurement accuracy, if k is large, the time t needs to be small, and if k is small, the time t needs to be large. Thus, it was understood that the convergence time period has an inverse proportional relationship to the reaction rate.

Evaluation

A comparison was made between measurement results according to the method according to the present disclosure and measurement results according to a known method.

Evaluation 1

Figure 26:
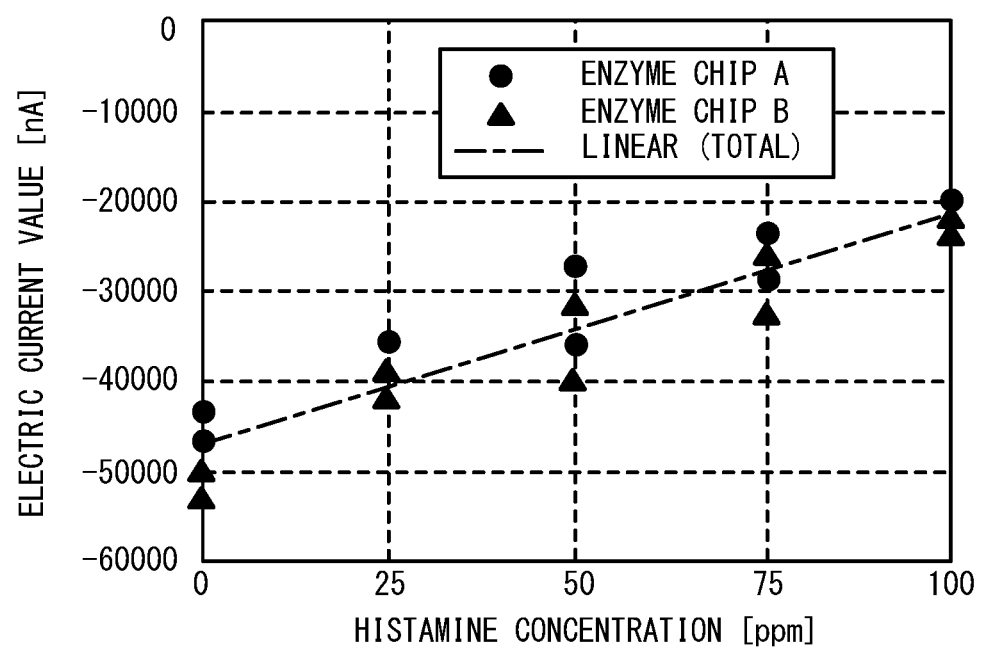
FIG. 26 is a graph obtained using actual measured data showing a relationship between the second electric current i before normalization and the histamine concentration, in a known method.
Figure 27:
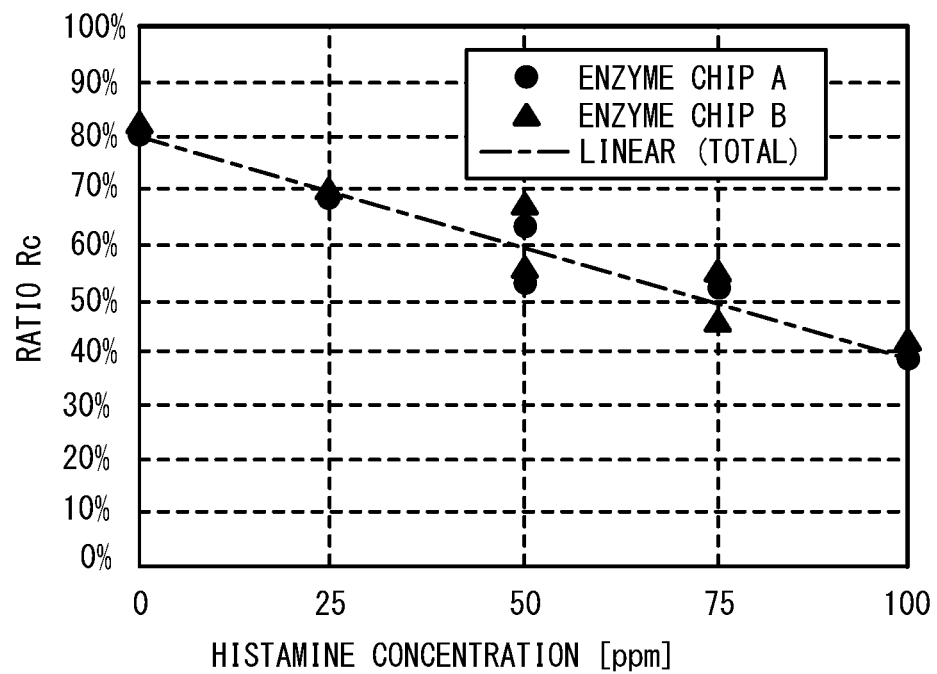
FIG. 27 is a graph obtained using actual measured data showing a relationship between the ratio Rc representing the second electric current i after normalization and the histamine concentration, in a method according to the present disclosure.

In the known method, the electric current was used that was subject to the impact of the coefficients $\alpha$ and $\beta$ without normalizing the second electric current i. FIG. 26 and FIG. 27 respectively show data of the second electric current i before normalization (the electric current value after two minutes, refer to FIG. 26), and the ratio Rc indicating the normalized second electric current i (the electric current value after two minutes normalized using the first electric current $i_0$, refer to FIG. 27). The histamine in a fish extraction solution was measured using two different enzyme chips (enzyme chips A and B). As shown in FIG. 26, before performing the normalization of the second electric current i, due to individual differences in the enzyme chip and variations in the electric current value, a coefficient of determination $R^2=0.88$ is obtained that is equivalent to an estimation accuracy of the histamine. On the other hand, as shown in FIG. 27, when the normalization of the second electric current i is performed, this figure becomes $R^2=0.95$, and it was verified that the measurement accuracy improved.

Evaluation 2

Figure 28:
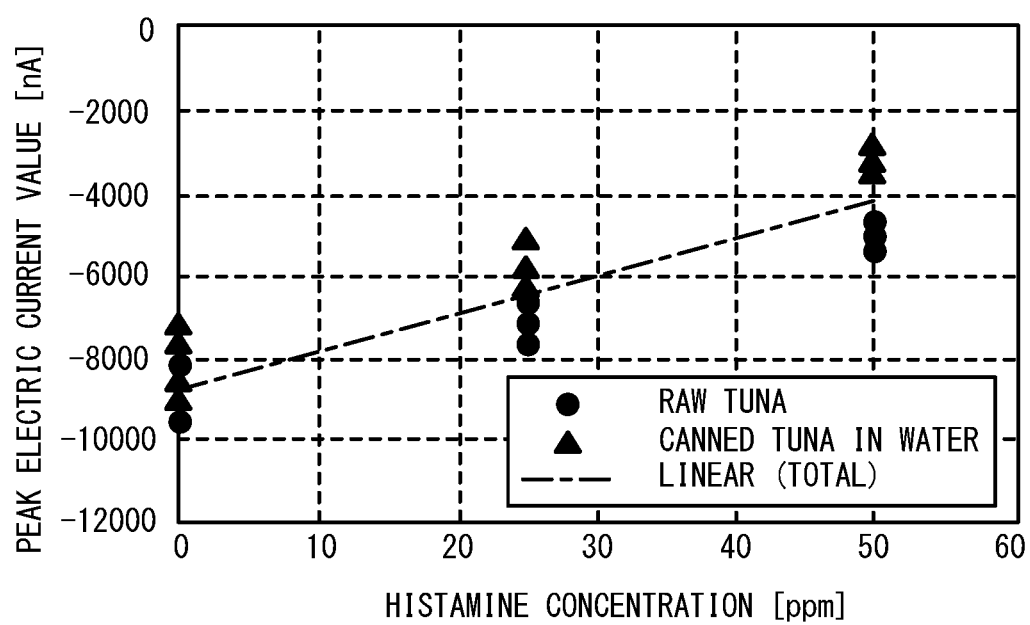
FIG. 28 is a graph obtained using actual measured data showing a relationship between a peak electric current value and the histamine concentration when the histamine concentration is measured by sweeping, in the known method.

As the known method, the histamine concentration was measured by sweeping. In an example shown in FIG. 28, raw tuna and canned tuna in water were used as samples. Then, with respect to these samples, measurements were performed on samples to which histamine was not added, and samples to which histamine was added equivalent to 25 ppm and 50 ppm. In terms of data, the peak electric current value was plotted when the voltage of the electrode was swept from 0 mV to −800 mV at −20 mV/sec. Further, a regression line with respect to the data of the two samples was calculated. Note that the coefficient of determination was $R^2=0.82$.

Figure 29:
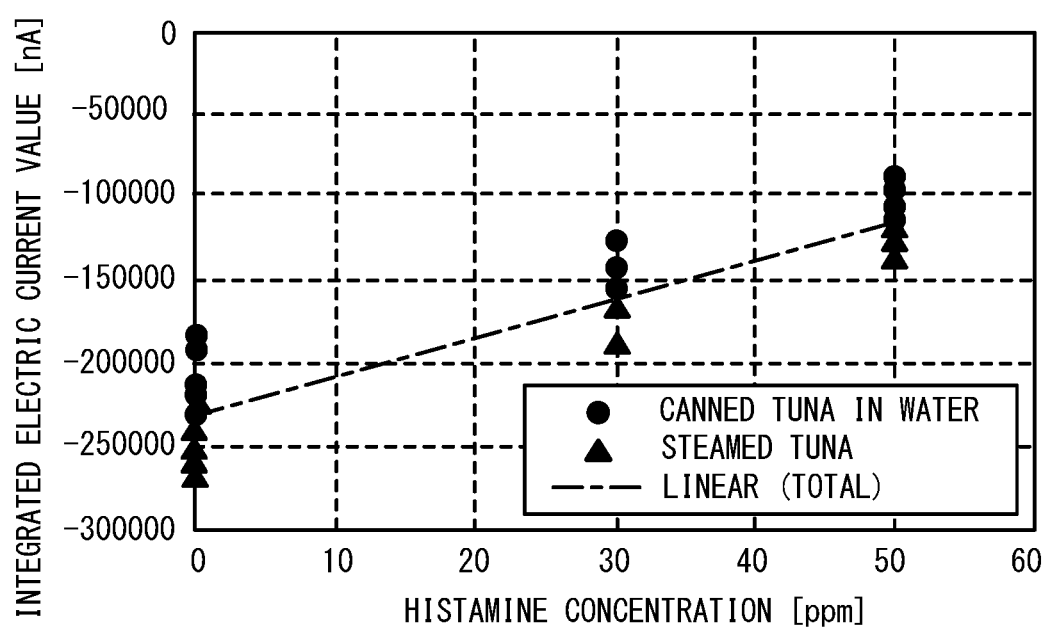
FIG. 29 is a graph obtained using actual measured data showing a relationship between the histamine concentration and an integrated value of the second electric current i before normalization, in the known method.
Figure 30:
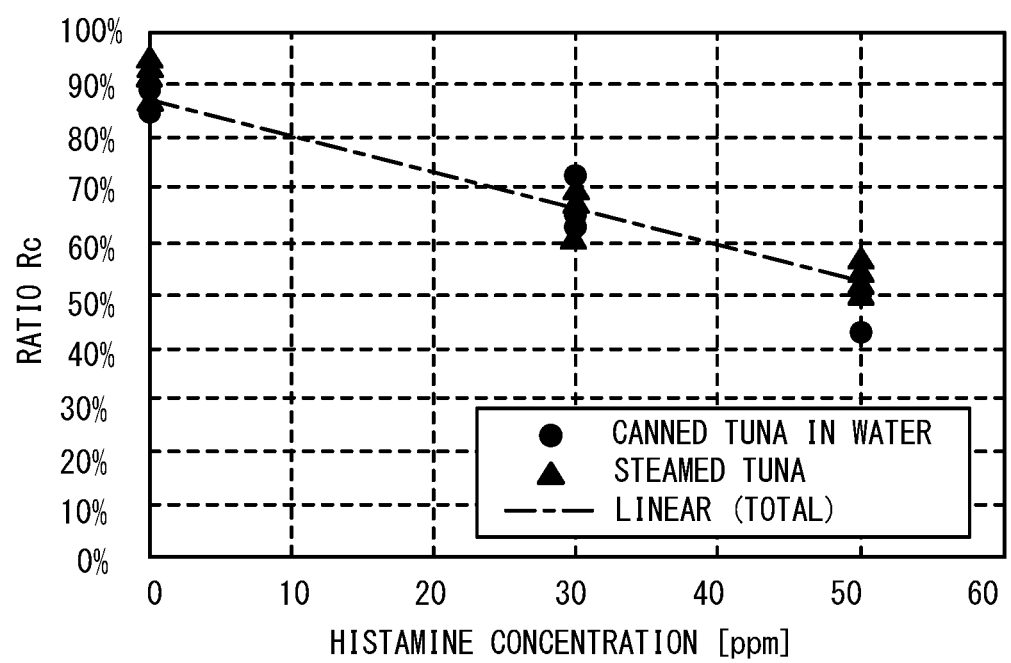
FIG. 30 is a graph obtained using actual measured data showing a relationship between the histamine concentration and the ratio Rc representing the second electric current i after normalization, in the method according to the present disclosure.

The relationship between the histamine concentration and the integrated value of the second electric current i (without normalization) when the known method was used is shown in FIG. 29. The relationship between the histamine concentration and the ratio Rc indicating the normalized value of the second electric current i when the method according to the present disclosure was used is shown in FIG. 30. An extraction solution of canned tuna in water and an extraction solution of steamed tuna were used as samples. In FIG. 29 and FIG. 30, regression lines were calculated with respect to the integrated value and the histamine concentration obtained using the two samples. In the case of the known method, $R^2=0.88$, and in the case of the method according to the present disclosure, $R^2=0.95$. From this, the measurement accuracy of the known method does not change from when the voltage was swept (FIG. 28), but it was verified that the accuracy improved using the method according to the present disclosure.

Evaluation 3

Figure 31:
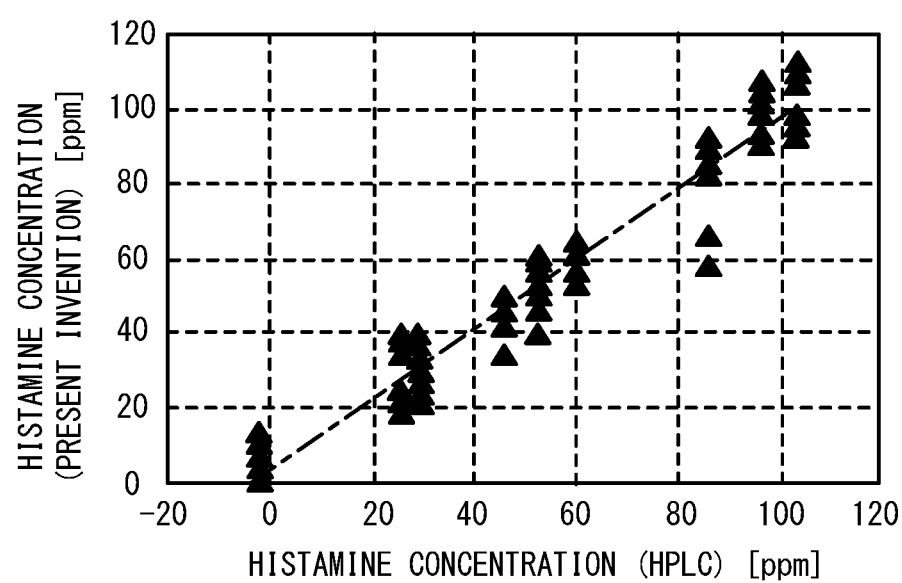
FIG. 31 is a graph obtained using actual measured data showing a relationship between concentrations of histamine respectively measured using HPLC and using the method according to the present disclosure, when using raw tuna.
Figure 32:
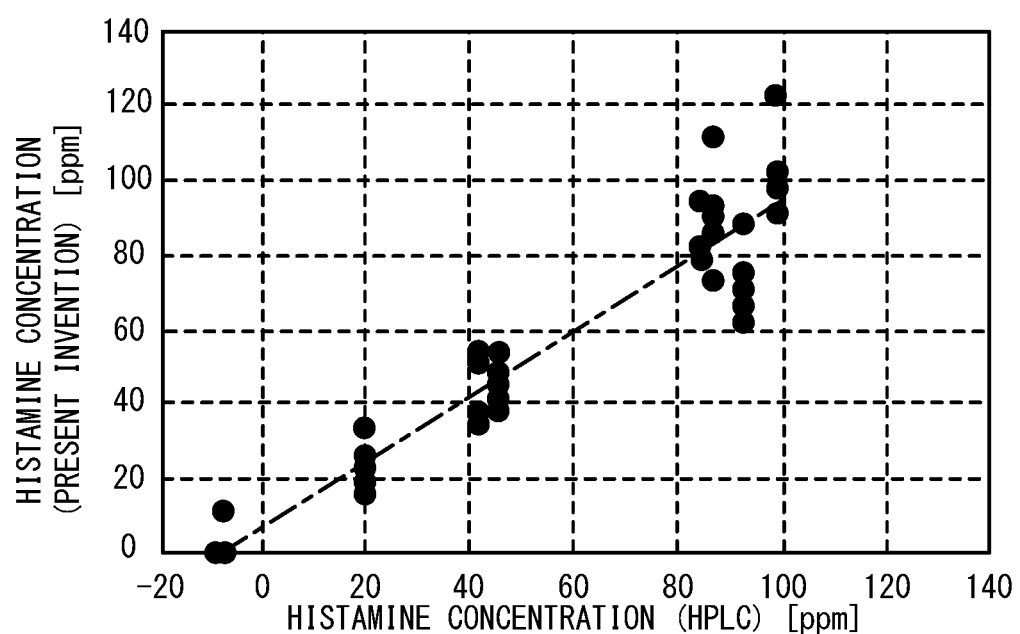
FIG. 32 is a graph obtained using actual measured data showing a relationship between concentrations of histamine respectively measured using HPLC and using the method according to the present disclosure, when using canned tuna in water.

Histamine concentration measured using the method according to the present disclosure, and histamine concentration measured using high performance liquid chromatography (HPLC) were compared. Results when raw tuna was used as a sample are shown in FIG. 31. Results when an extraction solution of canned tuna in water was used as a sample are shown in FIG. 32. From these results, the coefficient of determination $R^2$ was smaller than 0.9 in both cases. From this, it was verified that the histamine concentration can be measured with a high degree of accuracy by applying the method according to the present disclosure.

Evaluation 4

Figure 33:
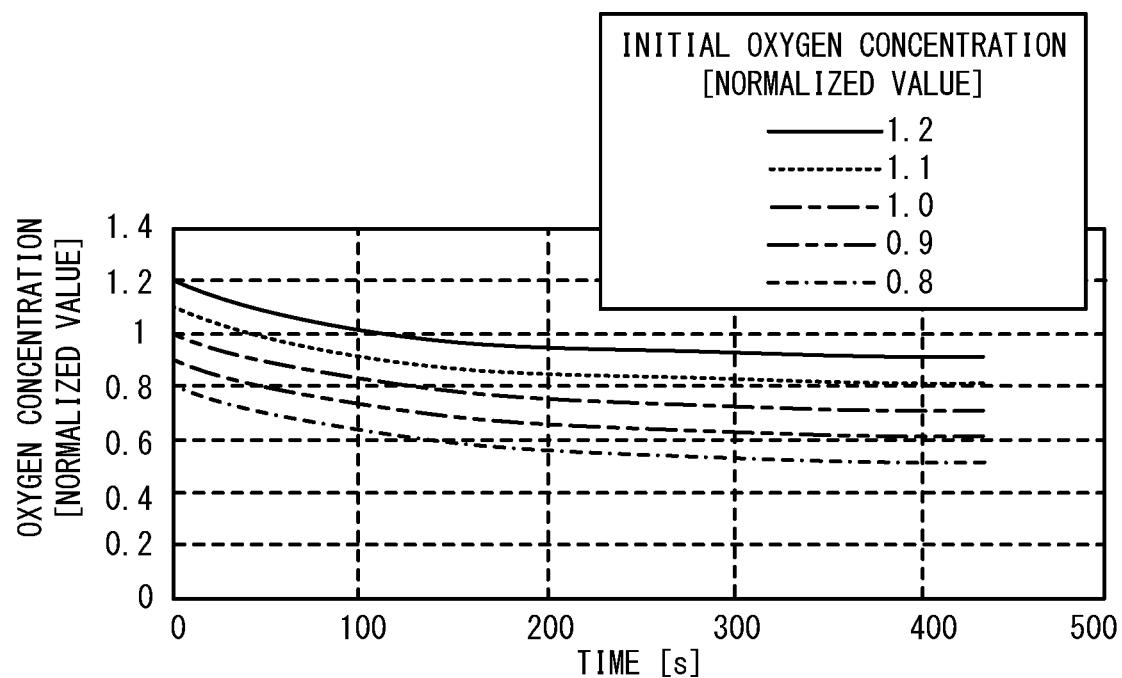
FIG. 33 is a graph obtained by simulation showing, for each of initial concentrations of oxygen, changes over time of the oxygen concentration.
Figure 34:
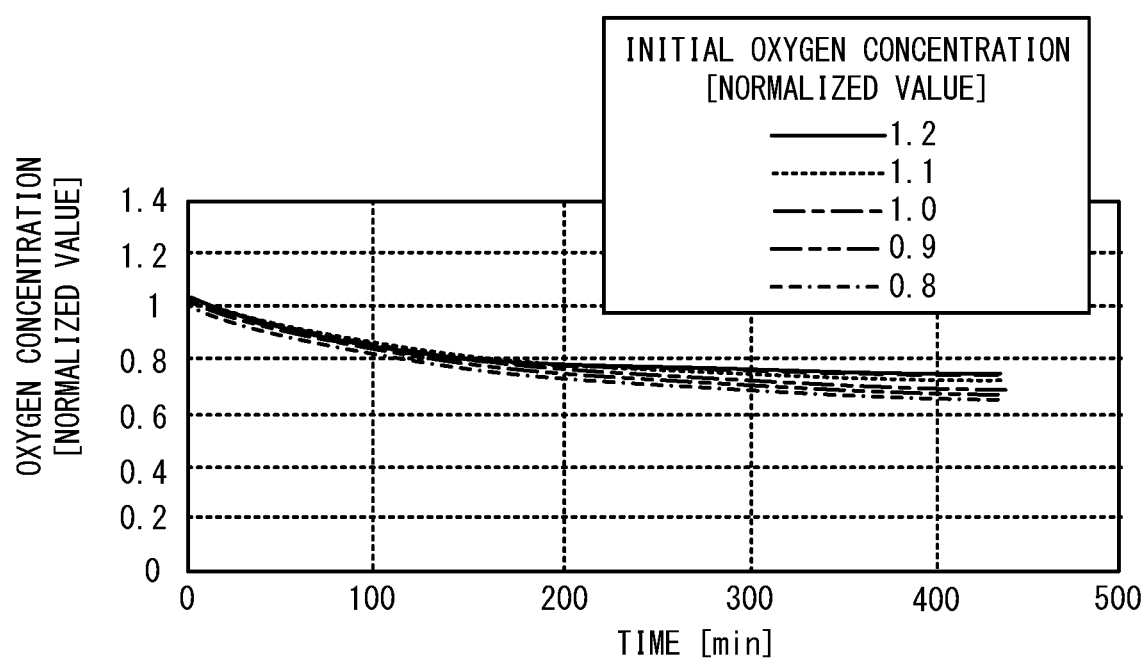
FIG. 34 is a graph obtained by simulation showing, for each of the initial concentrations of oxygen, changes over time of values obtained by normalizing the concentrations of oxygen using the initial oxygen concentration at 1.0.

Changes over time of the oxygen concentration were evaluated for each of initial oxygen concentrations. FIG. 33 shows the changes over time of the oxygen concentration when the initial oxygen concentrations (normalized values) were 1.2, 1.1, 1.0, 0.9, and 0.8, respectively. FIG. 34 shows changes over time of values obtained by normalizing the results of FIG. 33 by the initial oxygen concentration of 1.0. From the results in FIG. 33 and FIG. 34, it was understood that the changes over time of the oxygen concentration come together regardless of the value of the initial oxygen concentration. Further, the oxygen concentration is changed by ±20% at a time in FIG. 33 and FIG. 34, but, from the fact that at an elevation of 1000 m, for example, oxygen concentration falls by no more than approximately 10%, and atmospheric pressure also falls by no more than approximately 10% in a huge typhoon, it was understood that differences in the initial oxygen concentration are not a problem in practical terms.

Evaluation 5

Figure 35:
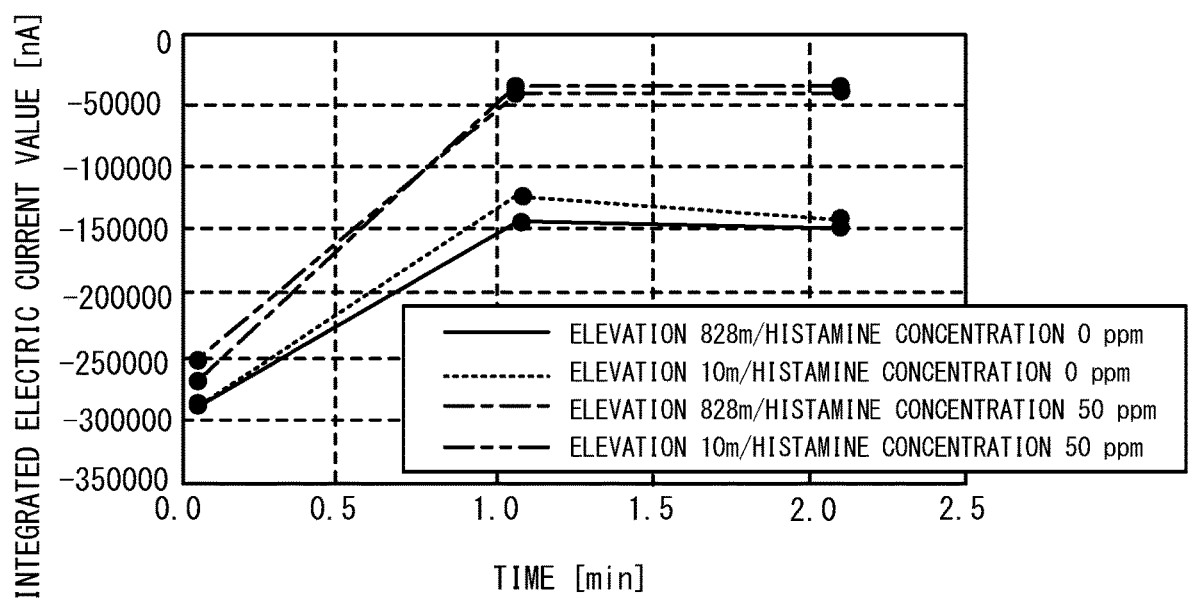
FIG. 35 is a graph obtained using actual measured data showing changes over time of an integrated electric current value, by elevation/histamine concentration.
Figure 36:
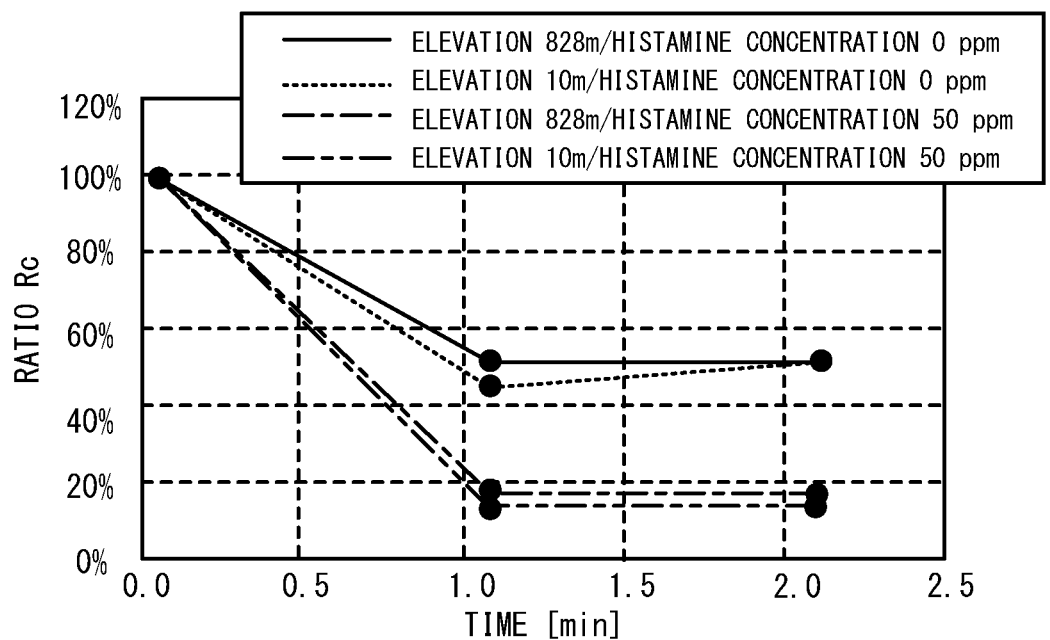
FIG. 36 is a graph obtained using actual measured data showing changes over time of the ratio Rc, by elevation/histamine concentration.

Changes over time of the integrated electric current value/ratio Rc at each of an elevation of 828 m (atmospheric pressure of 920 Pa), an elevation of 10 m (atmospheric pressure of 1012 Pa) were evaluated for each of histamine concentrations. FIG. 35 shows changes over time of the integrated electric current value measured under respective conditions of elevation of 828 m/histamine concentration of 0 ppm, elevation of 10 m/histamine concentration of 0 ppm, elevation of 828 m/histamine concentration of 50 ppm, and elevation of 10 m/histamine concentration of 50 ppm. FIG. 36 shows changes over time of the ratio Rc measured under the respective conditions of elevation of 828 m/histamine concentration of 0 ppm, elevation of 10 m/histamine concentration of 0 ppm, elevation of 828 m/histamine concentration of 50 ppm, and elevation of 10 m/histamine concentration of 50 ppm. From the results of FIG. 35 and FIG. 36, it was understood that the integrated electric current value and the ratio Rc were aligned in both cases, and experience almost no impact from the elevation (atmospheric pressure).

Operations and Effects of Present Embodiment

The electrode 32 of the measurement device 3 includes the enzyme membrane 10, in which the enzyme is formed as a membrane, on the surface thereof. IAA is generated as a degradation product of histamine reacting with the enzyme. As a result of the application of the voltage to the electrode 32A, the measurement device 3 electrolyzes the oxygen consumed in accordance with the IAA generated as a result of the histamine breaking down. The measurement device 3 uses the electrolysis reaction of the oxygen resulting from the application of the voltage to the electrode 32A, and can measure the histamine concentration from concentration changes in the oxygen.

The measurement device 3 measures the first electric current $i_0$ flowing through the electrode 32A in accordance with the application of the first voltage V(1) by the processing at step S13 (step S15), and measures the second electric current i flowing through the electrode 32A in accordance with the application of the second voltage V(2) by the processing at step S17 (step S19). The measurement device 3 determines the histamine concentration on the basis of the first electric current $i_0$ and the second electric current i (step S21). More specifically, the measurement device 3 measures the histamine concentration on the basis of the ratio Rc obtained by dividing the second electric current i by the first electric current $i_0$. In other words, since a dissolved oxygen concentration in an initial state of the containing solution 30 is substantially constant at normal temperature and normal pressure, the measurement device 3 measures the histamine concentration using a state before the histamine reaction occurs as a reference. By calculating the ratio Rc, the measurement device 3 can eliminate the impact of the coefficients α and β, and can reduce the possibility of the measurement accuracy deteriorating in accordance with fluctuations in the coefficients α and β. Thus, the measurement device 3 can measure the histamine concentration with an even higher degree of accuracy.

The measurement device 3 measures, as the first electric current $i_0$, the integrated value of the electric current flowing during the period in which the first voltage V(1) is applied by the processing at step S13 (step S15). The measurement device 3 measures, as the second electric current i, the integrated value of the electric current flowing during the period in which the second voltage V(2) is by the processing at step S17 (step S19). The first electric current $i_0$ and second electric current i measured in this case appropriately reflect the amount of oxygen electrolyzed by the application of the voltage to the electrode 32A, and an impact of a difference in the electric current value based on differences in the coefficients α and 0 is reduced. Thus, the measurement device 3 can further reduce the possibility of the accuracy deteriorating in accordance with the fluctuations in the coefficients α and β, and can measure the histamine concentration with an even higher degree of accuracy. As a result, it is possible to reduce the possibility of error occurring in the measurement results in accordance with individual differences between the electrodes 32A of the sensor chips 3A.

The measurement device 3 determines the histamine concentration by applying the calculated ratio Rc to the linear function f stored in the storage device 22 (step S21). Thus, the measurement device 3 can easily determine the histamine concentration on the basis of the ratio Rc.

The measurement device 3 causes the first voltage V(1) applied at step S13 and the second voltage V(2) applied at step S17 to be the same. Further, the measurement device 3 causes the first application time period Ta(1) over which the first voltage V(1) is applied at step S13 and the second application time period Ta(2) over which the second voltage V(2) is applied at step S17 to be the same. In this way, the measurement device 3 can identify the histamine concentration on the basis of the ratio Rc with a high degree of accuracy.

The measurement device 3 determines whether the containing solution 30 is dripped onto the electrode 32 (step S11), and applies the first voltage V(1) to the electrode 32A (step S13) at a timing at which it is determined that the containing solution 30 has been dripped (yes at step S11). In this case, in the period from when the containing solution 30 is dripped onto the electrode 32 to when the application of the first voltage V(1) is started, the measurement device 3 can suppress a reaction amount when the histamine in the containing solution 30 reacts. Thus, the measurement device 3 can suppress the degradation amount of the histamine during that period, and can thus measure the histamine concentration with an even higher degree of accuracy.

The electrode 32 of the sensor chip 3A includes the electrode 32A as the working electrode, the electrode 32B as the counter electrode, and the electrode 32C as the reference electrode. The measurement device 3 measures the electric current by applying the voltage to the electrode 32A on the basis of a three electrode method. Thus, the measurement device 3 can even more accurately determine a substance amount of an analyte, compared to a case in which the electric current is measured by applying the voltage to the electrode on the basis of a two electrode method.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

MODIFIED EXAMPLES

The present disclosure is not limited to the above-described embodiment, and various modifications are possible. The measurement device 3 may be configured by the sensor chip 3A only. In this case, the measurement portion 31 may measure the electric current value of the electric current flowing as a result of applying the voltage to the electrode 32, and may detect the concentration of histamine contained in the sample in the containing solution 30. The sensor chip 3A may display the detected concentration on a display portion (not shown in the drawings). Furthermore, the measurement device 3 may have a structure in which the sensor chip 3A and the main body 3B are integrated.

The target of the concentration measurement by the measurement device 3 is not limited to histamine. For example, the measurement device 3 may detect amine that includes histamine. Furthermore, the measurement device 3 may detect a non-protein contained substance included in a sample obtained from an organism. Further, the measurement device 3 may measure the oxygen concentration. For example, the user may convert the oxygen concentration measured by the measurement device 3 to a histamine concentration, using another device.

The measurement device 3 may measure a concentration of hydrogen peroxide of which an amount increases when oxygen is generated by electrolysis. In this case, in accordance with the hydrogen peroxide being generated at the boundary surface of the electrode 32A, a concentration gradient of the hydrogen peroxide is formed in the containing solution 30, and the hydrogen peroxide is scattered from the electrode 32A. For example, the user may convert the concentration of hydrogen peroxide measured by the measurement device 3 to a concentration of histamine, using another device. Further, the measurement device 3 may directly measure the histamine concentration on the basis of the measured concentration of hydrogen peroxide.

Another substance may be a measurement target by changing an enzyme. The concentration of the analyte may be measured by applying another reaction method, without using the enzyme. Further, for example, a reaction promoting substance such as the enzyme need not necessarily be placed on the electrode. In this case, for example, changes over time may be measured by dripping a solution onto the electrode after a reaction promoting agent is mixed into the solution.

The measurement device 3 measures the histamine concentration on the basis of the ratio Rc obtained by dividing the second electric current i by the first electric current $i_0$. In contrast to this, the measurement device 3 may measure the histamine concentration using another method to normalize (standardize) the second electric current i using the first electric current $i_0$. For example, the measurement device 3 may acquire a plurality of the first electric currents $i_0$ and the second electric currents i by repeatedly performing the main processing a plurality of times, and may measure the histamine concentration by statistically analyzing the acquired first electric current $i_0$ and second electric current i.

The measurement device 3 determines the histamine concentration by applying the calculated ratio Rc to the linear function f stored in the storage device 22 (step S21). The measurement device 3 may determine the histamine concentration from the ratio Rc using another method. For example, the measurement device 3 may store, in the storage device 22, a table in which a plurality of candidates of the ratio Rc and histamine concentrations corresponding to each of the plurality of candidates are associated with each other. The measurement device 3 may determine, as the histamine concentration in the containing solution 30, the histamine concentration associated with one, of the plurality of candidates, that most closely approximates the calculated ratio Rc.

The measurement device 3 measures, as the first electric current $i_0$, the integrated value of the electric current flowing during the period in which the first voltage V(1) is applied (step S15), and measures, as the second electric current i, an integrated value of the electric current flowing during the period in which the second voltage V(2) is applied (step S19). In contrast to this, the measurement device 3 may measure, as the first electric current $i_0$, a peak value of the electric current flowing through the electrode 32A when the first voltage V(1) is applied by the processing at step S13. In a similar manner, the measurement device 3 may measure, as the second electric current i, a peak value of the electric current flowing through the electrode 32A when the second voltage V(2) is applied by the processing at step S17.

The measurement device 3 may include a dripping mechanism that drips the containing solution 30 onto the electrode 32. The measurement device 3 may start the application of the first voltage V(1) to the electrode 32A at a timing at which the dripping mechanism drips the containing solution 30 onto the electrode 32 (step S13).

Figure 37:
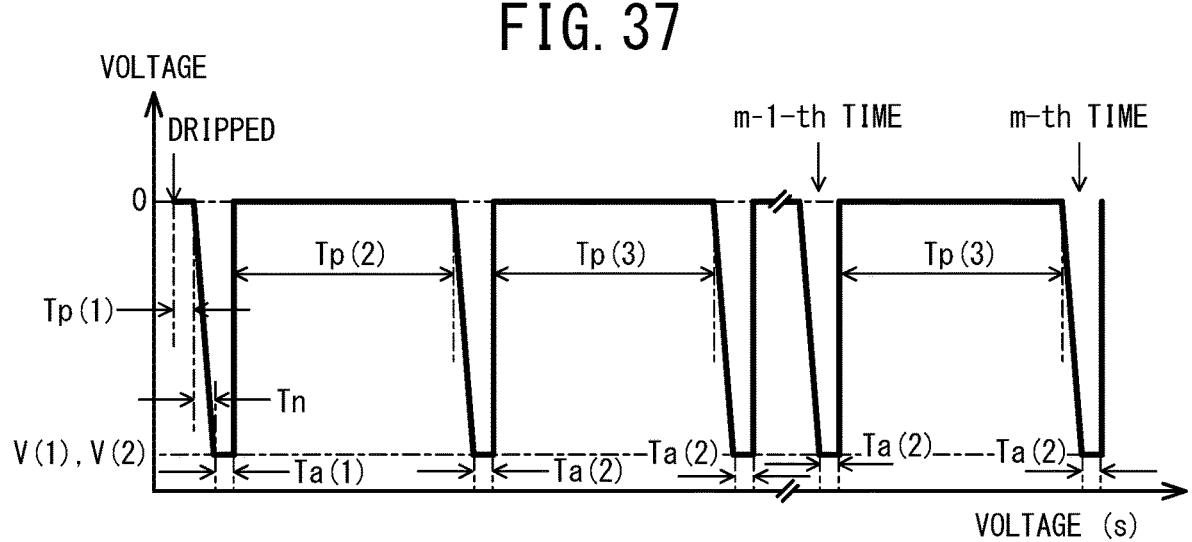
FIG. 37 is a graph showing changes over time of a second voltage V(2) applied m times to the electrode, in a modified example.

The measurement device 3 may apply the second voltage V(2) to the electrode 32A two times or more. For example, when the second voltage V(2) is applied m times (m is an integer of 2 or more), as shown in FIG. 37, after the second voltage V(2) is applied for an m−1-th time, the measurement device 3 may apply the second voltage V(2) for an m-th time, after a third elapsed time period Tp(3) has elapsed. Note that the third elapsed time period Tp(3) is prescribed in advance as a time period until changes in the concentration of the oxygen in the vicinity of the electrode 32A due to the application of the second voltage V(2) recover, due to the diffusion of the oxygen, to an extent that does not impact on the measurement accuracy. The third elapsed time period Tp(3) is, more specifically, 120 s, and is the same as the second elapsed time period Tp(2).

Note that a value of the second voltage V(2) may differ each time the second voltage V(2) is applied m times. A value of the second elapsed time period Tp(2) may differ each time the second voltage V(2) is applied m times. The third elapsed time period Tp(3) may have a different value to the second elapsed time period Tp(2). A value of the third elapsed time period Tp(3) may differ for each of intervals when the second voltage V(2) is applied m times.

A plurality of the second elapsed time periods Tp(2) may be stored in advance in the storage device 22 of the measurement device 3. The CPU 21 may acquire, from the storage device 22, the appropriate second elapsed time period Tp(2) in accordance with measurement conditions and the like, and may perform the measurement. At this time, the CPU 21 may select, in accordance with the measurement conditions and the like, whether to acquire the recovery time period or the convergence time period as the second elapsed time period Tp(2). Further, the CPU 21 may calculate and determine the optimum second elapsed time period Tp(2), in accordance with the measurement conditions and the like, each time the measurement is performed.

The measurement device 3 may measure the second electric current i each time the second voltage V(2) is applied m times. Furthermore, the measurement device 3 may measure the histamine concentration on the basis of a relationship with the first electric current $i_0$, by statistically analyzing the second electric current i measured m times. More specifically, for example, the measurement device 3 may perform linear approximation of the second electric current i measured m times and identify a linear function, and may determine the histamine concentration on the basis of the gradient of the identified linear function.

Note that the second elapsed time period Tp(2) and the third elapsed time period Tp(3) are not limited to the time period until changes in the concentration of the oxygen in the vicinity of the electrode 32A due to the application of the second voltage V(2) recover, due to the diffusion of the oxygen, to an extent that does not impact on the measurement accuracy. As long the second elapsed time period Tp(2) and the third elapsed time period Tp(3) are within a time range in which the changes in concentration of the oxygen in the vicinity of the electrode 32A due to the immediately preceding application of the voltage to the electrode 32A are resolved to an extent that does not impact on the measurement accuracy, the second elapsed time period Tp(2) and the third elapsed time period Tp(3) may be shorter than the time period until the changes in concentration of the oxygen in the vicinity of the electrode 32A recover. For example, the ratio Rc after a long period of time may be estimated using changes over time of an extent of decrease in the second electric current i. The CPU 21 may determine the histamine concentration on the basis of the estimated ratio Rc. This is described more specifically below.

Figure 38A:
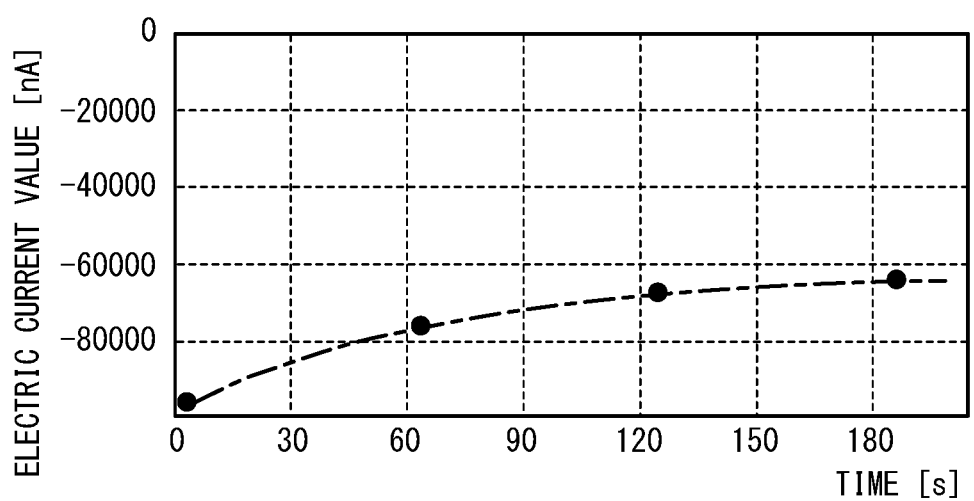
FIG. 38A is a graph obtained using actual measured data showing a relationship between the elapsed time period after the application of the first voltage V(1) and the measured second electric current i (A)
Figure 38B:
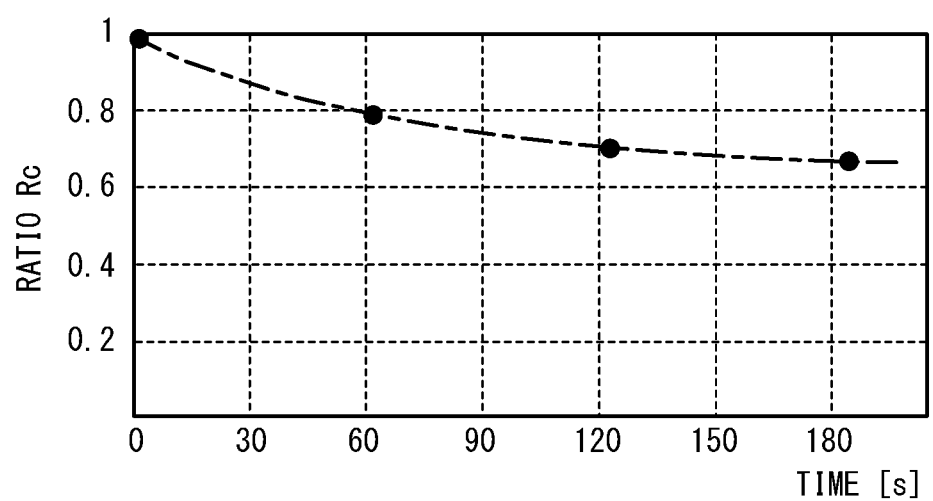
FIG. 38B is a graph obtained using actual measured data showing the relationship between the first electric current $i_0$, the second electric current i, and the ratio Rc.

FIG. 38A and FIG. 38B are graphs showing changes over time of the electric current value and an electric current value ratio obtained by applying a rectangular wave of –600 mV four times at 60 second intervals, to a sample of canned tuna in water to which histamine is not added. FIG. 38A is a graph showing, when the first voltage V(1) and the second voltage V(2) shown in FIG. 37 are applied to the electrode 32A, a relationship between the elapsed time period from the application of the first voltage V(1) and a measured value (the first electric current $i_0$ or the second electric current i) of the electric current flowing through the electrode 32A at the time of the voltage application. FIG. 38B is a graph plotting the ratio Rc (=i/$i_0$) between the first electric current $i_0$ and the second electric current i, for each of elapsed time periods from the application of the first voltage V(1). Note that the second elapsed time period Tp(2) and the third elapsed time period Tp(3) are 60 s, respectively, and m is three. Firstly, each of plots in FIG. 38A are fitted using a function $F(t)=ae^{-bt}$ c. In a similar manner, each of plots in FIG. 38B are fitted using a function $F'(t)=a'e^{-b't}+C$. Note that a, b, c, a', b', and c' are, respectively, constants applied in order to approximate each of the plots. t is an elapsed time period from the application of the first voltage V(1).

In other words, after the elapsed time t from when the first voltage V(1) is applied, the electric current flowing in accordance with the voltage having been applied to the electrode 32A can be derived using the function F(t). In this case, by applying the function F(t), the measurement device 3 can estimate a convergence value of the electric current flowing in accordance with the voltage application to the electrode 32A, before the electric current actually converges. In a similar manner, the ratio Rc after the elapsed time t from when the first voltage V(1) is applied can be derived using the function F'(t). In this case, by applying the function F'(t), the measurement device 3 can estimate the histamine concentration on the basis of the ratio Rc before the electric current flowing in accordance with the application of the voltage to the electrode 32A actually converges. In this case, the histamine concentration can be accurately identified in a shorter period of time.

Figure 39:
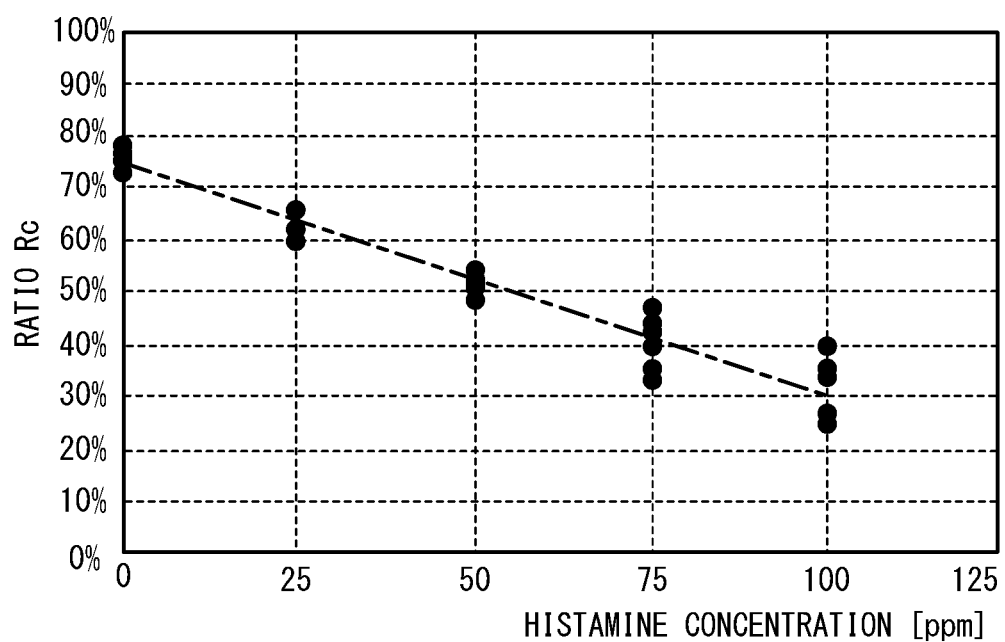
FIG. 39 is a graph obtained using actual measured data showing relationships between the histamine concentration, the first electric current $i_0$, the second electric current i, and the ratio Rc.

FIG. 39 is a graph showing a relationship between the ratio Rc calculated on the basis of the measured value of the second electric current i flowing when the second voltage V(2) is applied for a third time and the histamine concentration. More specifically, FIG. 39 is a graph in which the ratio Rc is plotted with respect to the histamine concentration when a rectangular wave of –600 mV is applied four times at 60 second intervals, to a sample of canned tuna in water to which histamine is not added, and to samples to which histamine is added equivalent to 25 ppm, equivalent to 50 ppm, equivalent to 75 ppm, and equivalent to 100 ppm. A timing at which the electric current is measured in order to calculate the ratio Rc is after three minutes has elapsed from when the first voltage V(1) is applied to the electrode 32A. Here, when the horizontal axis is an x axis and the vertical axis is a y axis, each of the plots is fitted using a function with which function y=–0.0043x×0.7118.

FIG. 40 shows results when the ratio Rc identified from the second electric current i flowing when the second voltage V(2) is applied after four minutes to ten minutes have elapsed is calculated on the basis of the function y, and the histamine concentration estimated on the basis of the calculated ratio Rc was evaluated. More specifically, FIG. 40 shows simulation results (after four minutes onward) when the electric current value was estimated after four minutes onward from the actual measurement data over three minutes shown in FIG. 39. Note that the results when the second voltage V(2) was applied after three minutes had elapsed are based on actually measured values. In FIG. 40, histamine sensitivity [/ppm] is an index showing to what extent the ratio Rc changes per 1 ppm of histamine, and corresponds to the gradient of the graph in FIG. 39. Further, $R^2$ indicates a coefficient of determination obtained by squaring a correlation coefficient R between the actual histamine concentration and the estimated histamine concentration, that is, indicates a contribution ratio.

From the results of the histamine sensitivity and $R^2$, it was understood that, in a range in which the elapsed time period is from four minutes to ten minutes, the histamine concentration estimated on the basis of the ratio Rc calculated on the basis of the function y is accurately aligned with the actual histamine concentration. Further, from the results of $R^2$, since the value becomes greatest when the elapsed time period is five minutes, it was understood that it is possible to identify the histamine concentration with the greatest degree of accuracy when the elapsed time period is five minutes. Furthermore, from the results shown in FIG. 39 and FIG. 40, it was clear that, by applying the second voltage V(2) three times from the application of the first voltage V(1) until three minutes have elapsed, and respectively measuring the second electric current i at each timing, it is possible to accurately identify the histamine concentration by calculating the ratio Rc without applying the second voltage V(2) for a fourth time onward.

The electrode 32 may include only the working electrode and the counter electrode, and need not necessarily include the reference electrode. In this case, the measurement device 3 may measure the histamine concentration by applying the voltage to the electrode and measuring the electric current on the basis of the two electrode method.

What is claimed is:

1. A measurement method measuring changes over time of a concentration of a measurement substance that occurs due to a reaction occurring in an analyte as a result of a solution containing the analyte being dripped onto an electrode, by measuring an electric current that occurs due to electrolysis of the measurement substance, the measurement method comprising:
   a first application process of applying, to the electrode, a first voltage over a first application time period, after elapse of a first elapsed time period subsequent to the solution being dripped onto the electrode, the first elapsed time period having a range with which progress of the reaction due to passing of time does not impact measurement accuracy, the first voltage having a range with which a loss amount or an increase amount of the measurement substance due to electrolysis does not impact the measurement accuracy, and the first application time period having a range that does not impact the measurement accuracy;
   a first measurement process of measuring a first electric current flowing due to an application of the first voltage by the first application process;
   an acquisition process of acquiring, as a second elapsed time period, a recovery time period required for a concentration change of the measurement substance in the vicinity of the electrode resulting from the application of the first voltage to recover, due to diffusion of the measurement substance, to an extent not impacting on the measurement accuracy;
   a second application process of applying, to the electrode, at least one time, a second voltage over a second application time period, after elapse of the second elapsed time period acquired by the acquisition process subsequent to the first voltage being applied by the first application process, the second voltage having a range with which a loss amount or an increase amount of the measurement substance due to electrolysis does not impact the measurement accuracy, and the second application time period having a range that does not impact the measurement accuracy;
   a second measurement process of measuring a second electric current flowing due to an application of the second voltage by the second application process, each time the second voltage is applied the at least one time; and
   a measuring process of using the first electric current measured by the first measurement process to normalize the second electric current measured by the second measurement process, and measuring a concentration of the measurement substance that has changed based on the reaction or a concentration of the analyte that has changed based on the reaction.

2. The measurement method according to claim 1, wherein
   the acquisition process acquires a convergence time period as the second elapsed time period when the convergence time period is longer than the recovery time period, the convergence time period being a time period inversely proportional to a reaction rate of the reaction and being a time period until the reaction ends to an extent not impacting on the measurement accuracy.

3. A measurement device measuring changes over time of a concentration of a measurement substance that occurs due to a reaction occurring in an analyte as a result of a solution containing the analyte being dripped onto an electrode, by measuring an electric current that occurs due to electrolysis of the measurement substance, the measurement device comprising:
   a main body that is composed with a processor and a memory and is configured to control the electrode and a measuring portion to measure electric current, wherein
   the main body is configured
     to apply, to the electrode, a first voltage over a first application time period, after elapse of a first elapsed time period subsequent to the solution being dripped onto the electrode, the first elapsed time period having a range with which progress of the reaction due to passing of time does not impact measurement accuracy, the first voltage having a range with which a loss amount or an increase amount of the measurement substance due to electrolysis does not impact the measurement accuracy, and the first application time period having a range that does not impact the measurement accuracy;
     to measure a first electric current flowing due to an application of the first voltage;
     to acquire, as a second elapsed time period, a recovery time period required for a concentration change of the measurement substance in the vicinity of the electrode resulting from the application of the first voltage to recover, due to diffusion of the measurement substance, to an extent not impacting on the measurement accuracy;
     to apply, to the electrode, at least one time, a second voltage over a second application time period, after elapse of the second elapsed time period acquired by the main body subsequent to the first voltage being applied by the main body, the second voltage having a range with which a loss amount or an increase amount of the measurement substance due to electrolysis does not impact the measurement accuracy, and the second application time period having a range that does not impact the measurement accuracy;
     to measure a second electric current flowing due to an application of the second voltage, each time the second voltage is applied the at least one time; and
     to use the first electric current to normalize the second electric current, and to measure a concentration of the measurement substance that has changed based on the reaction or a concentration of the analyte that has changed based on the reaction.

* * * * *